US010524145B1

(12) United States Patent
Das et al.

(10) Patent No.: US 10,524,145 B1
(45) Date of Patent: Dec. 31, 2019

(54) METHOD AND SYSTEM FOR MAINTAINING USER APPLICATION SESSION PERFORMANCES IN A WIRELESS COMMUNICATION NETWORK

(71) Applicant: Wipro Limited, Bangalore (IN)

(72) Inventors: Amartya Kumar Das, Kolkata (IN); Subhas Chandra Mondal, Bangalore (IN); Subhrajyoti Panja, Kolkata (IN); Uttam Sarkar, Chandannagar (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/999,011

(22) Filed: Aug. 20, 2018

(30) Foreign Application Priority Data

Jun. 30, 2018 (IN) .............................. 201841024444

(51) Int. Cl.
*G01R 31/08* (2006.01)
*H04W 24/08* (2009.01)
*H04L 29/06* (2006.01)
*H04L 12/24* (2006.01)
*H04W 36/24* (2009.01)
*H04W 76/27* (2018.01)
*H04W 76/12* (2018.01)
*H04W 80/08* (2009.01)

(52) U.S. Cl.
CPC ......... *H04W 24/08* (2013.01); *H04L 41/0823* (2013.01); *H04L 69/22* (2013.01); *H04W 36/24* (2013.01); *H04W 76/12* (2018.02); *H04W 76/27* (2018.02); *H04W 80/08* (2013.01)

(58) Field of Classification Search
USPC ........... 370/468, 462, 236, 352, 395.41, 431
See application file for complete search history.

(56) References Cited

U.S. PATENT DOCUMENTS 8,811,289 B2 8/2014 Ivershen et al.
2013/0258865 A1 10/2013 Kovvali et al.

OTHER PUBLICATIONS

LTE Technical Specification ETSI TS 132 425, V9.5.0 (53 pages) (2011).
Fujitsu Network Communications Inc., "The Benefits of Cloud-RAN Architecture in Mobile Network Expansion," (8 pages) (2014).
(Continued)

*Primary Examiner* — Phuongchau Ba Nguyen
(74) *Attorney, Agent, or Firm* — Pepper Hamilton LLP

(57) ABSTRACT

This disclosure relates to method and system for maintaining user application session performances (UASP's) in a wireless communication network. In one embodiment, the method includes determining an aggregate UASP for each user and for each application at a serving base station and at each neighboring base station based on gathered performance data, determining an aggregate application performance level for each application at the serving base station and at each neighboring base station based on the aggregate UASP's for the users at the serving base station and at each of the neighboring base stations respectively, determining an aggregate application performance based on the aggregate application performance levels for the applications at the serving base station and at the neighboring base stations, and maintaining the UASP's by determining a corrective network action based on an average aggregate application performance at the serving base station and at each of the neighboring base stations.

17 Claims, 12 Drawing Sheets

(56) References Cited

OTHER PUBLICATIONS

Gomez et al., "Towards a QoE-Driven Resource Control in LTE and LTE-A Networks," Hindawi Publishing Corporation, J. Computer Networks Commun. 2013:Article ID 505910 (15 pages) (2013).
Gomez et al., "QoS Modeling for End-to-End Performance Evaluation Over Networks with Wireless Access," Hindawi Publishing Corporation, EURASIP J. Wireless Commun. Networking 2010:Article ID 831707 (17 pages) (2010).
Campolina P., "LTE Review Inter Frequency Load Balancing Analysis," Slide Presentation (23 pages) (2016).
Checko et al., "Cloud RAN for Mobile Networks—a Technology Overview", IEEE (25 pages) (2014).

```
                                                    ┌─ 900
                                                    ▼
┌─────────────────────────────────────────────────────────────────────┐
│ DETERMINE AN AGGREGATE USER APPLICATION SESSION PERFORMANCE         │
│ FOR EACH OF A PLURALITY OF USERS AND FOR EACH OF A PLURALITY OF     │
│ APPLICATIONS AT A SERVING BASE STATION AND AT EACH OF A PLURALITY   │
│ OF NEIGHBORING BASE STATIONS BASED ON GATHERED PERFORMANCE          │
│                              DATA 901                               │
└─────────────────────────────────────────────────────────────────────┘
                                  │
                                  ▼
┌─────────────────────────────────────────────────────────────────────┐
│ DETERMINE AN AGGREGATE APPLICATION PERFORMANCE LEVEL FOR EACH       │
│ OF THE PLURALITY OF APPLICATIONS AT THE SERVING BASE STATION AND    │
│ AT EACH OF THE PLURALITY OF NEIGHBORING BASE STATIONS BASED ON      │
│ THE AGGREGATE USER APPLICATION SESSION PERFORMANCES FOR THE         │
│ PLURALITY OF USERS AT THE SERVING BASE STATION AND AT EACH OF THE   │
│      PLURALITY OF NEIGHBORING BASE STATIONS RESPECTIVELY 902        │
└─────────────────────────────────────────────────────────────────────┘
                                  │
                                  ▼
┌─────────────────────────────────────────────────────────────────────┐
│ DETERMINE AN AGGREGATE APPLICATION PERFORMANCE BASED ON THE         │
│ AGGREGATE APPLICATION PERFORMANCE LEVELS FOR THE PLURALITY OF       │
│ APPLICATIONS AT THE SERVING BASE STATION AND AT THE PLURALITY OF    │
│                   NEIGHBORING BASE STATIONS 903                     │
└─────────────────────────────────────────────────────────────────────┘
                                  │
                                  ▼
┌─────────────────────────────────────────────────────────────────────┐
│ MAINTAIN THE USER APPLICATION SESSIONS PERFORMANCES BY APPLYING A   │
│ DETERMINED CORRECTIVE NETWORK ACTION BASED ON AN AVERAGE OF         │
│ AGGREGATE APPLICATIONS PERFORMANCES AT THE SERVING BASE STATION     │
│ AND AT EACH OF THE PLURALITY OF NEIGHBORING BASE STATIONS 904       │
└─────────────────────────────────────────────────────────────────────┘
```

FIG. 9

METHOD AND SYSTEM FOR MAINTAINING USER APPLICATION SESSION PERFORMANCES IN A WIRELESS COMMUNICATION NETWORK

This application claims the benefit of Indian Patent Application Serial No. 201841024444 filed Jun. 30, 2018, which is hereby incorporated by reference in its entirety.

TECHNICAL FIELD

This disclosure relates generally to communication network, and more particularly to a method and system for maintaining user application session performances in a wireless communication network.

BACKGROUND

The convergence of wireless networks and multimedia communications has resulted in rapid development of various services and increased competition between service providers. This, in turn, has caused a rise in user expectations with respect to wireless network service session performance. In particular, a user would like an increased Quality of Experience (QoE) of user's application session. Thus, user application specific network service session performance improvement has been one of the primary targets for the network service providers or operators. Such improvement typically require gathering of network service session level performance information so as to monitor service performance, assess performance degradation, and recommend corrective action for user specific application sessions.

However, existing techniques are limited in monitoring service performance for user specific application sessions. For example, existing techniques are plagued by data flooding and duplication issues and accuracy in key performance indicators (KPI's) generation issues. Data flooding and duplication may lead to delay in identification of relevant packets from collected packets. This may also result in information loss due to buffer-overflow. Additionally, it is not possible to get accurate KPI values without knowing exact number of instances of radio access network (RAN) protocol modules that is running in base station (BS). This is likely to lead to inaccurate KPI generation, which is not representing the appropriate application session level and network service-session level performance. Further, for example, existing techniques do not cater to different monitoring need for application-sessions. In other words, existing techniques are agnostic of user and application session, and monitor performance and collect performance data of application-sessions irrespective of their priorities, user attention level, and current performance level. This may result in ineffective monitoring of poor performing critical application sessions which may need immediate attention at any given moment.

Further, existing techniques are limited in assessing performance degradation for user specific application sessions. For example, existing techniques do not provide determination of Quality of Experience (QoE) for user application-session. Additionally, for example, existing techniques do not consider user feedback or user experience in determination of user application session performance, and, therefore, may not accurately represent actual user experience degradation. Further, for example, existing techniques that do provide for determination of subjective QoE (SQoE) as perceived by the end user may either perform incorrect determination of SQoE (in case of non-availability of application session performance information) or delayed determination of SQoE (in case of delayed arrival of application session performance information) due to air interface congestion. Such incorrect determination of SQoE or delayed determination of SQoE may result in ineffective assessment of application session performance.

Moreover, existing techniques are limited in recommending corrective action for user specific application sessions. For example, existing techniques do not provide identification of the neighboring cell (target cell) to move relevant users. Additionally, for example, existing techniques that provide for load based handover (LBHO) may not guarantee maintenance of user application session performance. The LBHO to a single random target BS may not be a panacea for all application session performance improvement or for all user applications. The LBHO to the single random target BS may improve some user application session, degrade some user application session, and discontinue some user application sessions. The random selection of one or more user for movement to the target BS with all its application-sessions may not be suitable corrective action for user specific application session performance improvement. On the contrary, such LBHO may degrade SQoE of application sessions with acceptable performance.

SUMMARY OF THE INVENTION

In one embodiment, a method for maintaining user application session performances (UASP's) in a wireless communication network is disclosed. In one example, the method may include determining an aggregate UASP for each of a plurality of users and for each of a plurality of applications at a serving base station and at each of a plurality of neighboring base stations based on gathered performance data. The method may further include determining an aggregate application performance level for each of the plurality of applications at the serving base station and at each of the plurality of neighboring base stations based on the aggregate UASP's for the plurality of users at the serving base station and at each of the plurality of neighboring base stations respectively. The method may further include determining an aggregate application performance based on the aggregate application performance levels for the plurality of applications at the serving base station and at the plurality of neighboring base stations. The method may further include maintaining the UASP's by determining a corrective network action based on an average aggregate application performance at the serving base station and at each of the plurality of neighboring base stations.

In one embodiment, a system for maintaining UASP's in a wireless communication network is disclosed. In one example, the system may include a network device which further includes at least one processor and a memory communicatively coupled to the at least one processor. The memory may store processor-executable instructions, which, on execution, may cause the processor to determine an aggregate UASP for each of a plurality of users and for each of a plurality of applications at a serving base station and at each of a plurality of neighboring base stations based on gathered performance data. The processor-executable instructions, on execution, may further cause the processor to determine an aggregate application performance level for each of the plurality of applications at the serving base station and at each of the plurality of neighboring base stations based on the aggregate UASP's for the plurality of users at the serving base station and at each of the plurality of neighboring base stations respectively. The processor-executable instructions, on execution, may further cause the processor to determine an aggregate application performance based on the aggregate application performance levels for the plurality of applications at the serving base station and at the plurality of neighboring base stations. The processor-executable instructions, on execution, may further cause the processor to maintain the UASP's by determining a corrective network action based on an average aggregate application performance at the serving base station and at each of the plurality of neighboring base stations.

In one embodiment, a non-transitory computer-readable medium storing computer-executable instructions for maintaining UASP's in a wireless communication network is disclosed. In one example, the stored instructions, when executed by a processor, may cause the processor to perform operations including determining an aggregate UASP for each of a plurality of users and for each of a plurality of applications at a serving base station and at each of a plurality of neighboring base stations based on gathered performance data. The operations may further include determining an aggregate application performance level for each of the plurality of applications at the serving base station and at each of the plurality of neighboring base stations based on the aggregate UASP's for the plurality of users at the serving base station and at each of the plurality of neighboring base stations respectively. The operations may further include determining an aggregate application performance based on the aggregate application performance levels for the plurality of applications at the serving base station and at the plurality of neighboring base stations. The operations may further include maintaining the UASP's by determining a corrective network action based on an average aggregate application performance at the serving base station and at each of the plurality of neighboring base stations.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 9 is a flow diagram of an exemplary process for maintaining user application session performances in a communication network, in accordance with some embodiments of the present disclosure.

DETAILED DESCRIPTION OF THE INVENTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
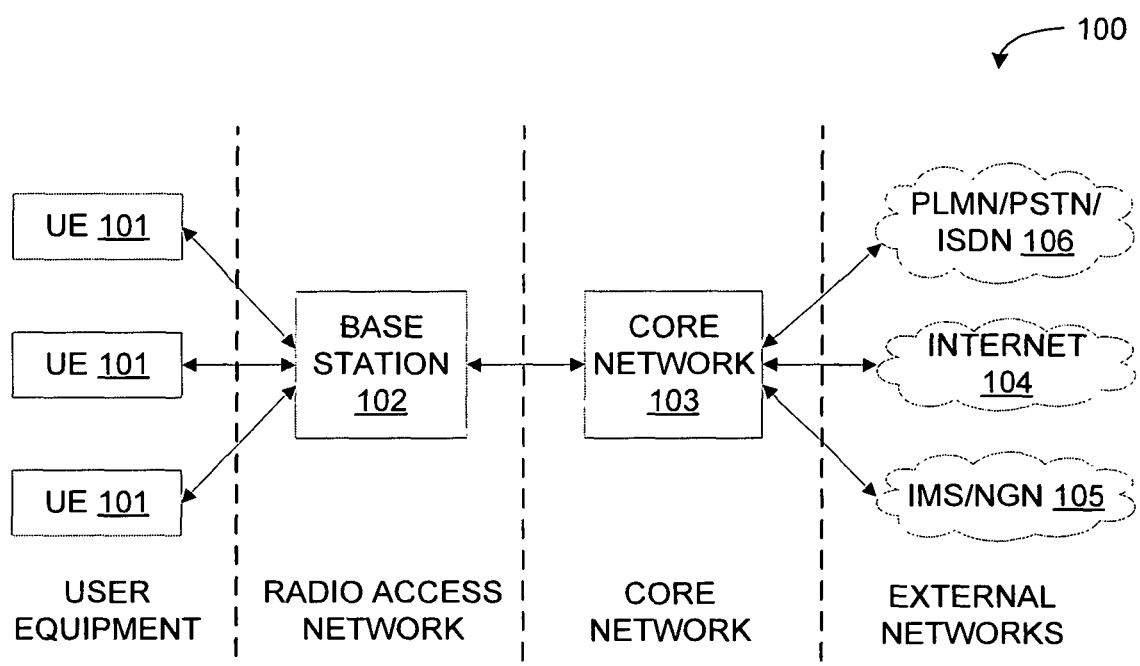
FIG. 1 illustrates an exemplary communication network architecture in which various embodiments of the present disclosure may function.

Referring now to FIG. 1, an exemplary communication network architecture in which various embodiments of the present disclosure may function is illustrated. The communication network 100 may include one or more user equipment (UE's) 101 communicating wirelessly with various radio access networks. Examples of a UE 101 may include, but are not limited to, a cell phone, a smart phone, a tablet, a phablet, and a laptop. Each of the radio access networks include a number of base stations (BS) 102, each supporting communication for a number of UE's 101 in its coverage area. It should be noted that the coverage area of a BS 102 may be divided into sectors that constitute only a portion of the total coverage area of all the base stations combined. Further, it should be noted that there may be overlapping coverage areas for different radio access networks employing different technologies. A UE 101 may communicate with a BS 102 during downlink (DL) and uplink (UL), using various transmission protocols. The downlink (or forward link) refers to the communication link from the BS 102 to the UE 101, and the uplink (or reverse link) refers to the communication link from the UE 101 to the BS 102.

For purpose of illustration, the various radio access networks (RAN's) include, but are not limited to, a GSM EDGE radio access network (GERAN), a UMTS terrestrial radio access network (UTRAN), an evolved UMTS terrestrial radio access network (E-UTRAN), an improved E-UTRAN, and any new radio access networks. A base transceiver station (BTS) and a base station controller (BSC) form the BS 102 for GERAN while a Node B and a radio network controller (RNC) form the BS 102 for UTRAN. Similarly, evolved Node B (eNodeB or eNB) acts as the BS 102 for E-UTRAN i.e., long term evolution (LTE) network, while an improved eNB may act as the BS 102 for improved E-UTRAN i.e., advance LTE. The depicted radio access networks are merely exemplary, and thus it will be understood that the teachings of the disclosure contemplate other existing wireless radio access networks (e.g., worldwide interoperability for microwave access (WiMAX) network, High Speed Packet Access (3GPP's HSPA) network, and so forth) or any new wireless radio access networks that may provide for processing of data packets for transmission, in accordance with embodiments of the present disclosure.

Each of the radio access networks may be communicatively coupled with a respective core network, which in turn may communicate with external networks (packet switched networks or circuit switched networks). The core network 103 may include a packet core network which in turn may be communicatively coupled with external packet switched networks (e.g., Internet 104, IP multimedia subsystem (IMS) network 105, or a next generation network (NGN) 105, etc.) or a circuit switched core network which in turn may communicate with external circuit switched networks (e.g., public land mobile network (PLMN) 106, public switched telephone network (PSTN) 106, integrated service digital network (ISDN) 106, etc.).

For example, the GERAN and the UTRAN communicate with a circuit switched core network comprising mobile services switching center (MSC), gateway MSC (GMSC), home location register or visitor location register (HLR/VLR). The MSC and GMSC serve the UE 101 in its current location for circuit switched services and are responsible for the interworking with external circuit switched networks. In some embodiments, the MSC and GMSC also interwork with external packet switched networks, such as IP multimedia subsystem (IMS) network. For example, the MSC may connect to a media gateway (MGW) of the IMS network. The HLR/VLR is a mobile operator database accessible by MSC and which includes information with respect to users such as phone number, location within home/visiting network, and so forth. Further, the GERAN and the UTRAN also communicate with a packet core that includes serving GPRS support node (SGSN) and gateway GPRS support node (GGSN). As will be appreciated by those skilled in the art, a general packet radio service (GPRS) is a packet-oriented mobile data service that enables 2G and 3G cellular networks to transmit IP packets to external networks such as the Internet. The SGSN is a component of the GPRS network that handles functions related to packet switched data within the network such as packet routing and transfer, mobility management, charging data, authentication of the users, and so forth. Similarly, GGSN is another component of the GPRS network and is responsible for the interworking between the GPRS network and external packet switched networks, such as Internet or IMS network.

Similarly, E-UTRAN communicates with an evolved packet core (EPC) that includes a mobility management entity (MME), a serving gateway (SGW), a packet data network gateway (PGW), a policy control and charging rules function (PCRF), and a Home Subscriber Server (HSS). The MME may be responsible for evolved packet system (EPS) session management (ESM), EPS mobility management (EMM), EPS connection management (ECM), non-access stratum, ciphering and integrity protection, inter core network signaling, system architecture evolution (SAE) bearer control, handover, and so forth. The combined functionalities of the SGW and the PGW may include lawful interception (LI), packet routing and forwarding, transport level packet marking in the uplink and the downlink, accounting on user, packet filtering, mobile IP, policy enforcement, and so forth. The PGW further connects the EPC with external packet switched networks such as the Internet or NGN. The PCRF is responsible for policy enforcement decisions as well as for charging functionalities. The HSS is a master user database containing user subscription related information such as user identification, user profile, and so forth. The HSS performs authentication and authorization of the user, and so forth.

The NGN 105 or IMS network 105 may include a node (e.g., media gateway controller (MGC) in case of the NGN, or a serving—call session control function (S-CSCF) in case of the IMS networks) that anchors the session and is responsible for session management, routing and control. Additionally, the node may be responsible for control and management of media servers. The NGN 105 or IMS network 105 may further include a media gateway (MGW) that enables multimedia communications across packet-switched and circuit-switched networks by performing conversions between different transmissions and coding techniques. In some embodiments, the NGN 105 or IMS network 105 may also include a signalling gateway that may be used for performing interworking between signalling protocols such as signalling system 7 (SS7) when connecting to PSTN/PLMN networks 106 and IP-based signalling protocols such as SIGTRAN which is supported by the node. It should be noted that, in some embodiments, the NGN 105 or IMS network 105 may also access and use the HSS.

As will be appreciated, the communication network 100 may correspond to multiple-access networks capable of supporting multiple users (i.e., UE's 101) by sharing the available network resources (e.g., time, frequency, and power). For example, conventional third generation (3G) and fourth generation (4G) communication networks employ various multiple access techniques, such as code division multiple access (CDMA) in 3G, and frequency division multiple access (FDMA) or time division multiple access (TDMA) in 4G.

Further, as will be appreciated, a long term evolution (LTE) network is a 4G wireless communication network, and is an end to end Internet protocol (IP) network supporting only packet switching. The LTE network provides for high sector capacity, improved end-user throughputs, and reduced user plane latency. It therefore provides for significantly improved user experience along with greater mobility. The LTE network includes a number of 4G enabled UE's 101, a number of evolved Node B's (eNB's) as base stations 102, and an evolved packet core (ePC) as core network 103. The user's application data (UAD) are transmitted over Ethernet channels between the ePC and the eNB's, and over air interface between the eNB's and the UE's 101. The data packets are transmitted between the UE's 101 and the eNB's in downlink as well as in uplink using a data packet transmission protocol known as packet data convergence protocol (PDCP), as well as using various other protocols such as radio link control (RLC) protocol, medium access control (MAC) protocol, and so forth. For example, the downlink (DL) data packets flow through the PDCP, RLC and MAC protocol handlers within the eNB while the uplink (UL) data packets flow through the PDCP, RLC and MAC protocol handlers within the UE.

The description below describes an LTE network for purposes of example, and LTE terminologies are used in much of the description below. However, as stated above the techniques are applicable beyond LTE networks. Thus, for example, the techniques may be applicable to any wireless communication networks (e.g., GERAN, UTRAN, improved E-UTRAN, etc.) that employ data packet transmission. Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 2:
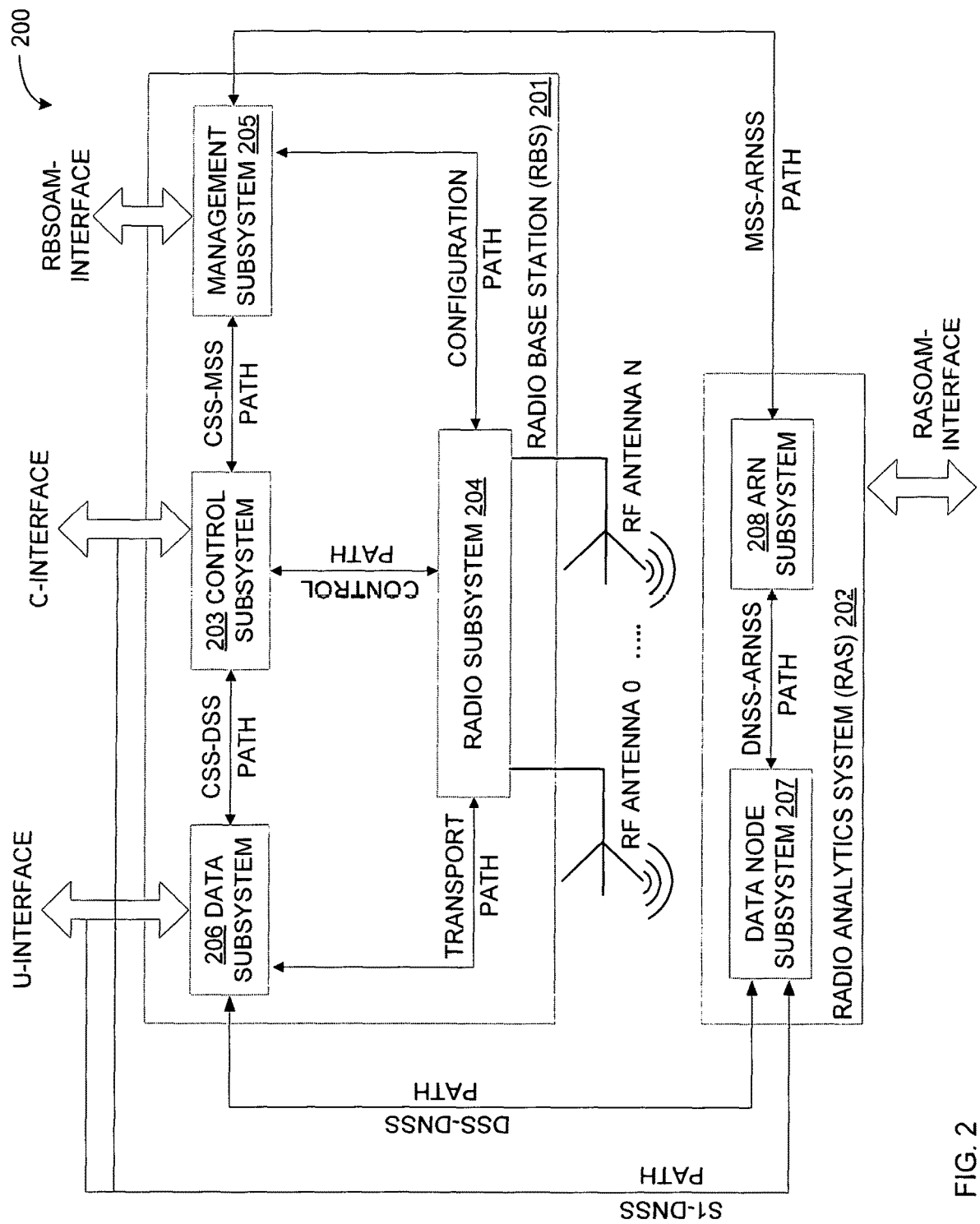
FIG. 2 is a functional block diagram of an exemplary system for maintaining user application session performances in a communication network, in accordance with some embodiments of the present disclosure.

Referring now to FIG. 2, a functional block diagram of an exemplary system 200, for maintaining user application session performances (UASP's) in the communication network 100 of FIG. 1, is illustrated in accordance with some embodiments of the present disclosure. In particular, the system 200 may include a network device as a part of the communication network 100. For example, the network device may be an exemplary radio base station (RBS) 201 or an exemplary radio analytics system (RAS) 202. The RBS 201 may operate in conjunction with RAS 202 so as to maintain UASP's in the communication network 100, in accordance with some embodiments of the present disclosure. It should be noted that, in some embodiments, the RBS 201 may be an evolved Node B (eNB). Additionally, it should be noted that though the description below focuses on eNB, the description may also be equally applicable to other base station (e.g., Node B) and will follow substantially similar principles with appropriate modifications in the corresponding subsystems.

As will be described in greater detail below, the RBS 201 may be responsible for radio resource management, header compression and encryption of user data stream, packet scheduling and transmission, broadcast information transfer, physical layer processing, and so forth. In some embodiments, the RBS 201 may include a control subsystem (CSS) 203, a radio subsystem (RSS) 204, a management subsystem (MSS) 205, and a data subsystem (DSS) 206. Further, as will be described in greater detail below, the RAS 202 may be responsible for distributed information collection at radio access network, consolidation of collected information, analytics of radio access network, and so forth. In some embodiments, the RAS 202 may include a data node subsystem (DNSS) 207 and an analytics and reporting node subsystem (ARNSS) 208.

The CSS 203 may be responsible for carrying control messages for UE's and core network, and will be described in greater detail in FIG. 3 below. The RSS 204 may be responsible for radio communication with the UE's through various radio specific elements. As will be appreciated, the RSS 204 may communicate with the UE's through a number of RF Antennas (RF Antenna 0 . . . RF Antenna N). The RSS 204 will be described in greater detail in FIG. 4 below. The MSS 205 may be responsible for system level management of co-channel interference, radio resources, and other radio transmission characteristics in RBS, and will be described in greater detail in FIG. 5 below. The DSS 206 may be responsible for carrying user traffic as well as control messages for UE's in conjunction with CSS 203, and will be described in greater detail in FIG. 6 below. The CSS 203 may configure the DSS 206 using configuration messages. The DNSS 207 may be responsible for tapping the user and signaling data from RBS 201 through one or more interfaces. In particular, the DNSS 207 may intercept and tap user and signaling data, and generate key performance indicators (KPI's). The DNSS 207 will be described in greater detail in FIG. 7 below. The ARNSS 208 may be responsible for consolidating generated KPI's, detecting network service quality, performing decision making, and so forth, and will be described in greater detail in FIG. 8 below.

Each of these subsystems 203-208 may interact with each other and with external components through a number of interfaces and data paths. For example, a bidirectional link, U-interface (e.g., S1-U interface), connecting the DSS 206 to the serving gateway (SGW) in the EPC may carry the user plane data over the socket interface. A gateway tunneling protocol (GTP-U) may be employed for communication to exchange user data. It should be noted that the user space data may be data packets between multimedia servers or other users and user multimedia applications such as video, VoIP, gaming, etc. Similarly, a bidirectional link, C-interface (e.g., S1-MME interface), connecting the CSS 203 to MME in the EPC may carry the control plane information over the socket interface. A S1 application protocol (S1-AP) may be employed for communication to exchange control data. It should be noted that the control space data may be data packets between packet core/RBS and users and may be responsible for radio connection establishment, mobility management (e.g., mobility handling), and session management (e.g., session establishment & termination). Additionally, a bidirectional link, RBSOAM-interface, connecting the MSS 205 to operations administration and management (OAM) subsystem may carry the management or configuration information over the socket interface. The RBSOAM-interface may be employed to receive management or configuration information from the OAM subsystem and to provide system level feedback to the OAM subsystem. A TR-69 protocol may be employed for communication to exchange management or configuration data. It should be noted that the management or configuration data may be management or configuration information from the OAM subsystem that may be required for configuration or instantiation of RBS 201. Further, a bidirectional link, RASOAM-interface, connecting the DNSS 207 as well as the ARNSS 208 to the OAM subsystem may carry the configuration information over the socket interface. The RASOAM-interface may be employed to receive configuration information from the OAM subsystem. Any IP based protocol may be employed for communication to exchange configuration data. It should be noted that the configuration data may be configuration information from the OAM subsystem that may be required for configuration or instantiation of RAS 202.

Further, for example, a bidirectional link, transport path, connecting the DSS 206 with the RSS 204 may carry the user plane data as well as control plane data over the message queues depending on protocols employed (e.g., radio link control (RLC) protocol, packed data convergence protocol (PDCP), and medium access control (MAC) protocol). Similarly, a bidirectional link, control path, connecting the CSS 203 with the RSS 204 may carry control plane information over the message queues using radio resource control (RRC) protocol. It should be noted that, in some embodiments, transport path and control path may be interchangeably used depending on the different protocols employed and messages that they carry. Additionally, a bidirectional link, configuration path, connecting the MSS 205 with the RSS 204 may carry configuration information for the RSS 204 over the message queues. In some embodiments, a Femto API (FAPI) standard may be employed for communication in the above referenced paths. Further, a bidirectional link, CSS-DSS path, connecting the DSS 206 with the CSS 203 may be employed to send and receive control and configuration messages from the CSS 203. Similarly, a bidirectional link, CSS-MSS path, connecting the MSS 205 with the CSS 203 may be employed for sending control instruction and configuration parameters to the CSS 203 and for receiving the system level measurement data from the CSS 203.

Moreover, a bidirectional link, DSS-DNSS path, connecting the DSS 206 with the DNSS 207 may be employed to intercept and tap control and user data of the RBS 201 and to send the same to the DNSS 207. It should be noted that the tapping may be employed at different interface level of DSS 206 in case of multi-split deployment scenario of cloud RAN (C-RAN). Further, the DNSS 207 may send the specification for such data collection to the DSS 206 through the DSS-DNSS path. Similarly, a unidirectional link, S1-DNSS path, connecting the S1 interfaces (e.g., S1-U interface and S1-MME interface) with the DNSS 207 may be employed to intercept and tap signaling and user data (i.e., S1 data) being transmitted between the RBS 201 and the core network. As will be described in detail below, the tapped data may be employed to generate KPI's. Additionally, a bidirectional link, MSS-ARNSS path, connecting the MSS 205 with the ARNSS 208 may be employed to send recommended decisions to the MSS 205 for optimization of network resources or for improvement of deteriorated UASP's. Further, a bidirectional link, DNSS-ARNSS path, connecting the DNSS 207 with the ARNSS 208 may be employed to send generated KPI's from the DNSS 207 to the ARNSS 208. Further, the ARNSS may instruct different deep packet inspection (DPI) configurations through the DNSS-ARNSS path.

As will be appreciated, during first-time start-up, the system 200 may perform startup initialization by taking latest inputs of configuration parameters (e.g. from management application that may be a part of the MSS 205, the DNSS 207, or the ARNSS 208) and storing a copy of the received configuration parameters in a local memory of the CSS 203, the DNSS 207, or the ARNSS 208. As will be appreciated, the CSS 203 may also configure DSS 206 with the received configuration parameters. During subsequent start-ups, the system 200 may perform reconfiguration of parameters. The system 200 may check if there has been any change in the RBS 201 or the RAS 202 configuration parameters. For example, the system 200 may check if there is any new configuration parameter by checking the existing parameters. The system 200 may also check if any configuration parameter is modified by checking the parameter value. If there is no change in configuration parameters, the system 200 may load configuration parameters from the local memory of CSS 203, the DNSS 207, or the ARNSS 208 for performing configuration. However, if there are changes in the configuration parameters, the CSS 203 may receive configuration information of RBS 201 from remote storage of the management application through the CSS-MSS communication path. Similarly, the DNSS 207 or the ARNSS 208 may receive configuration information of RAS 202 from remote storage of the management application through the RASOAM interface. The CSS 203, the DNSS 207, or the ARNSS 208 may then configure modified parameters in the RBS 201, the DNSS 207, and the ARNSS 208 respectively, and store a copy of updated configuration parameters in the aforementioned local memory of the CSS 203, the DNSS 207, or the ARNSS 208.

Figure 3:
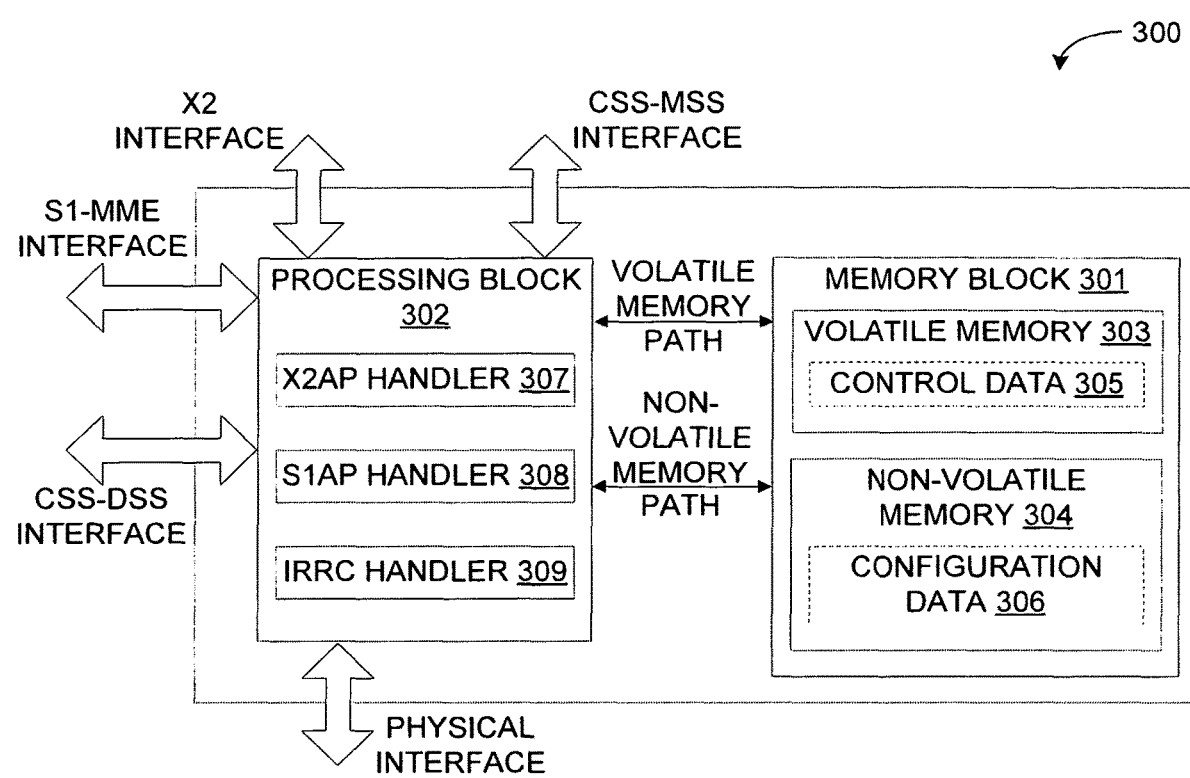
FIG. 3 is a functional block diagram of an exemplary control subsystem that may be employed in the RBS, in accordance with some embodiments of the present disclosure.

Referring now to FIG. 3, a functional block diagram of an exemplary control subsystem (CSS) 300 is illustrated, in accordance with some embodiments of the present disclosure. The CSS 300 is analogous to the CSS 203 implemented by the RBS 201 of FIG. 2. The CSS 300 may include a memory block 301 and a processing block 302. The memory block 301 may include a volatile memory 303 and a non-volatile memory 304. The volatile memory 303 in the CSS 300 may store the control data 305 (i.e., data for controlling the radio access and connection between network and UE). For example, the volatile memory may store global UE identification ($UEID_{Global}$), global UE identification type ($UEID_{GlobalType}$) received from the IRRC handler as a part of control data, in accordance with some embodiments of the present disclosure. The processing block 302 may use volatile memory path to store and retrieve the control data 305 from the volatile memory 303. The non-volatile memory 304 in the CSS 300 may store the configuration data 306 received from MSS 205, which in turn may store the configuration data received from the OAM. As will be appreciated, the configuration data 306 from the MSS 205 may be employed to configure the CSS 203 to make it operational. The processing block 302 may use non-volatile memory path to store and retrieve configuration data 306 from the non-volatile memory 304. For example, the non-volatile memory 304 may store DSS configuration parameters (e.g., user-application list (APPList[ ]), IP address of DNSS 207 ($IP_{DNSS}$), port number of DNSS 207 ($PORT_{DNSS}$), measurement intervals ($T_{SmallestMeasurementInterval}$), and supported KPI list (SupportedKPI[ ]), etc.) received from the IRRC handler as a part of configuration data, in accordance with some embodiments of the present disclosure.

The processing block 302 may include a single processor with the multiple partitions or independent processors working in a group and configured to perform various functions. For example, the processing block 302 may include an X2 application protocol (X2AP) handler 307, a S1 application protocol (S1AP) handler 308, and an improved radio resource controller (IRRC) handler 309. The S1AP handler 308 may receive configuration data from the MSS 205 through CSS-MSS interface via the CSS-MSS path. The S1AP handler 308 may then process the configured data and may store it in the non-volatile memory 304. The S1AP handler 308 may further receive control data from packet core (MME) through S1-MME interface in downlink (DL) and from the IRRC handler 309 in uplink (UL). On receiving the data, the S1AP handler 308 may process the data (as per 3GPP TS 36.413 specification) and may perform services and functions that include, but are not limited to, E-RAB configuration, allocation to/release from user-service-context, initial context set-up transfer function, determination of UE capability information, mobility functions, S1 interface establishment and release, NAS signaling transport function, S1 UE context management, and so forth. After processing the received control data packets and performing the desired execution, the S1AP handler 308 may encode the control data packets and may send the same to the IRRC handler 309 in DL and to the packet core (MME) through S1-MME interface in UL. A CSS-DSS interface may be employed to send and receive control and configuration messages to and from the DSS 206 via the CSS-DSS path. As will be appreciated, the DSS configuration message may be enhanced with additional configuration parameters so as to enable DSS perform necessary monitoring of user application sessions. The additional configuration parameters may include, but may not be limited to, APPList[ ], $IP_{DNSS}$, $PORT_{DNSS}$, $T_{SmallestMeasurementInterval}$, SupportedKPI[ ], $UEID_{Global}$, $UEID_{GlobalType}$.

The X2AP handler 307 may receive configuration data from the MSS 205 through CSS-MSS interface via the CSS-MSS path. The X2AP handler 307 may then process the configured data and may store it in the non-volatile memory 304. The X2AP handler 307 may further receive control data packets from the IRRC handler 309 in the UL and the DL. The X2AP handler 307 may also receive control data packets through X2 interface from neighboring RBS's. On receiving the control data packets, the X2AP handler 307 may process the data (as per 3GPP TS 36.423 specification) and may perform the services and functions that include, but are not limited to, handover processing, RBS load processing, X2 interface establishment, RBS configuration, and so forth. After processing the received control data packets and performing the desired execution, the X2AP handler 307 may encode the control data packets and may send the same to IRRC handler 309 and to neighboring RBS's through X2 interface.

The IRRC handler 309 may receive configuration data from the MSS 205 via the CSS-MSS interface via the CSS-MSS path. The IRRC 309 may then configure itself based on the configuration data, and may send different configuration parameters to the UE's through physical (PHY) interface in DL and to the core network in UL. It should be noted that the PHY interface may include transport channels in the RBS 201 and may perform exchange of messages between the RSS 204 and the CSS 203. The IRRC handler 309 may receive UL control data packets from IRLC handler and IPDCP handler and DL control data packets from S1AP handler 308. On receiving the control data packets, the IRRC handler 309 may process the data (as per 3GPP TS 36.331 specification) and may perform services and functions that include, but are not limited to, system information broadcast for NAS and AS, paging notification, establishment, maintenance and release of an RRC connection between the UE and E-UTRAN, security handling, establishment, configuration, maintenance and release of point to point radio bearers, mobility decision processing, QoS management functions, UE measurement configuration and report handling, NAS message transfer between UE and core network, outer loop power control, and so forth. After processing the received control data packets and performing the desired execution, the IRRC handler 309 may encode the data packets and may send the same to UE handler in DL, to S1AP/X2AP handler through S1-MME interface in UL, and to neighboring RBS's through X2 interface.

Additionally, the IRRC handler 309 may perform below mentioned services and functions, in accordance with some embodiments of the present disclosure. The IRRC handler 309 may extract $UEID_{Global}$ and $UEID_{GlobalType}$ from first message at IRRC handler 309 from UE during attach as well as from handover request message during handover, and may pass the extracted data (i.e., $UEID_{Global}$ and $UEID_{GlobalType}$) to the DSS 206 during configuration. Additionally, the IRRC handler 309 may get the $IP_{DNSS}$ and $PORT_{DNSS}$ for DNSS 207 and may pass the same to DSS 206 during configuration stage. Further, the IRRC handler 309 may pass APPList[ ] received from the MSS 205 to the DSS 206. The user-application list may include list of user-application name ($Name_{Application}$) and user application identification ($ID_{Application}$).

Figure 4:
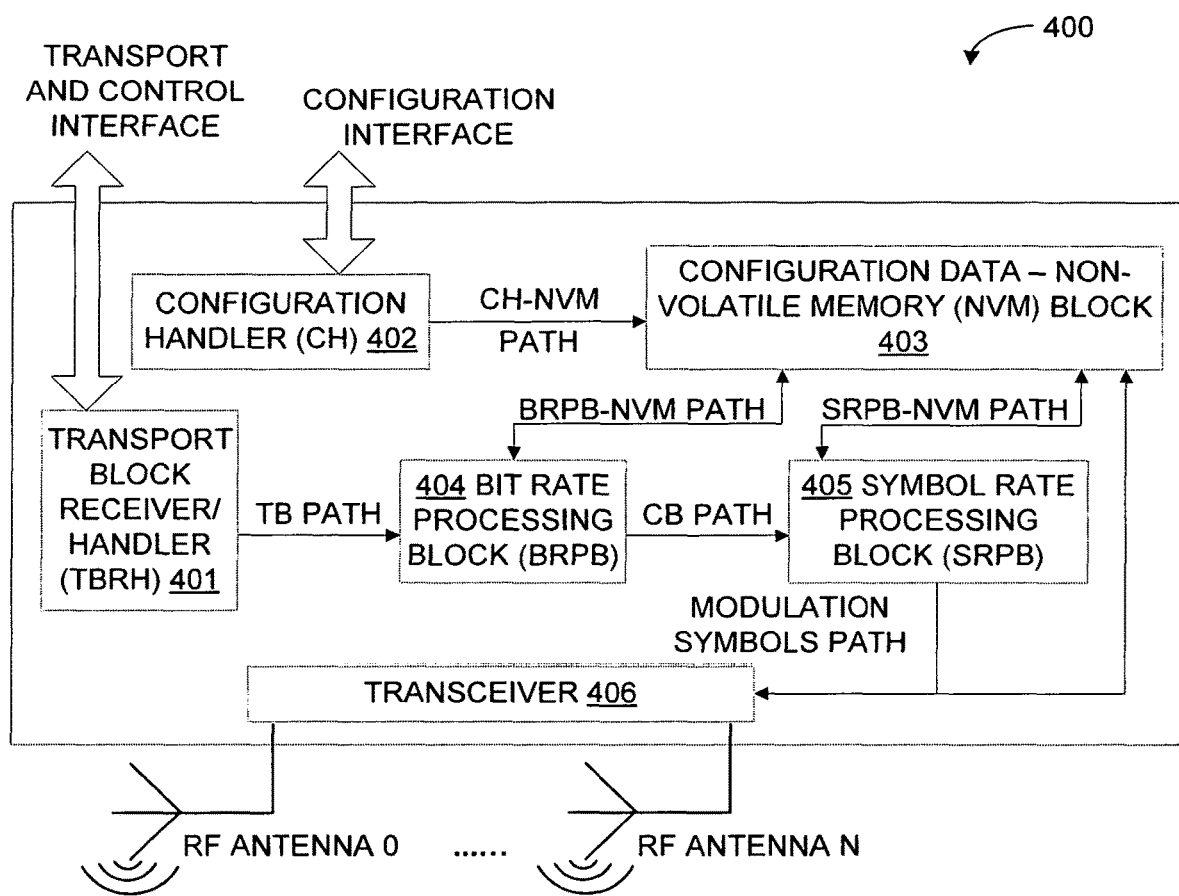
FIG. 4 is a functional block diagram of an exemplary radio subsystem that may be employed in the RBS, in accordance with some embodiments of the present disclosure.

Referring now to FIG. 4, a functional block diagram of an exemplary radio subsystem (RSS) 400 is illustrated, in accordance with some embodiments of the present disclosure. The RSS 400 is analogous to the RSS 204 implemented by the RBS 201 of FIG. 2. The RSS 400 may include a PHY handler (not shown), a transport block receiver or handler (TBRH) 401, a configuration handler (CH) 402, a configuration data non-volatile memory block 403, a bit rate processing block (BRPB) 404, a symbol rate processing block (SRPB) 405, and a transceiver 406.

The PHY handler may enable exchange of air interface messages between UE's and RBS 400 using PHY protocol. Additionally, the PHY handler may interface with DSS 206 and CSS 203 and may offer data transport services to higher layers. The PHY handler may be responsible for channel coding, PHY hybrid automatic repeat request (HARQ) processing, modulation, multi-antenna processing, mapping of the signal to the appropriate physical time-frequency resources, and so forth.

The TBRH 401 may receive user data and control streams from the DSS 206 in the form of transport blocks in a communication message over a transport/control interface via the transport/control path. The TBRH 401 may then classify the data as critical and non-critical data and forwards it to the BRPB 404 over a TB path. The TB path may be a uni-directional link connecting the TBRH 401 to the BRPB 404 and may carry the transport block over the message queue interface.

The CH 402 may receive configuration messages from the MSS 205 in a communication message over a configuration interface via the configuration path. The CH 402 may then classify and store the configuration information in the configuration data non-volatile memory block 403. The CH 402 may use a unidirectional CH-Non-Volatile memory path to write the configuration parameters to the configuration data non-volatile memory block 403. The configuration data may be stored in the non-volatile memory in the form of structures which may be accessible to rest of the RSS 400 modules.

The BRPB 404 may receive the transport blocks from the TBRH 401 in a communication message. The BRPB 404 may then process the received transport blocks as per the 3GPP TS 36.212 standard. For example, the BRBP 404 may calculate the cyclic redundancy check (CRC) and may attach the same to the transport block. If the transport block size is larger than the maximum allowable code block size, such as a block size of 6,144 bits, a code block segmentation may be performed. Consequently, a new CRC may be calculated and attached to each code block before channel encoding (turbo encoding) provides a high-performance forward-error-correction scheme for reliable transmission. The BRBP 404 may further perform rate matching (i.e., puncturing or repetition to match the rate of the available physical channel resource), and HARQ so as to provide a robust retransmission scheme when the user may fail to receive the correct data. Additionally, bit scrambling may be performed after code-block concatenation to reduce the length of strings of 0's or 1's in a transmitted signal to avoid synchronization issues at the receiver before modulation. The code blocks may be forwarded to symbol rate processor over a CB path. The CB path may correspond to a uni-directional link connecting the BRPB 404 to the SRPB 405 and may carry the code words over the message queue interface. A BRPB-Non-Volatile memory path may be employed to connect the BRPB 404 with the non-volatile memory where the configuration data may be stored.

The SRPB 405 may receive code blocks in a communication message from BRPB 404 over the CB path. The SRPB 405 may then process the received code blocks as per the 3GPP TS 36.212 standard. For example, the SRPB 405 may process the code blocks by converting them to modulation symbols. It should be noted that various modulation schemes (quadrature phase shift keying (QPSK), 16-quadrature amplitude modulation (16-QAM), or 64-QAM) may be employed. The modulation symbols may then be mapped to layers and precoding supports for multi-antenna transmission. The modulation symbols may be forwarded over a uni-directional high speed modulation symbols path to the transceiver 406 for transmission. A SRPB-Non-Volatile memory path may be employed to connect the SRPB 405 with the non-volatile memory where the configuration data may be stored.

The transceiver 406 may receive modulation symbols over the modulation symbols path. The transceiver 406 may then process the received code blocks as per the 3GPP TS 36.212 standard. For example, the transceiver may map the modulation symbols to resource elements for providing orthogonal multiple access (OMA) or non-orthogonal multiple access (NOMA). The resource elements may then be mapped to each antenna port and sent for air transmission through a number of RF Antennas (RF Antenna 0 . . . RF Antenna N).

Figure 5:
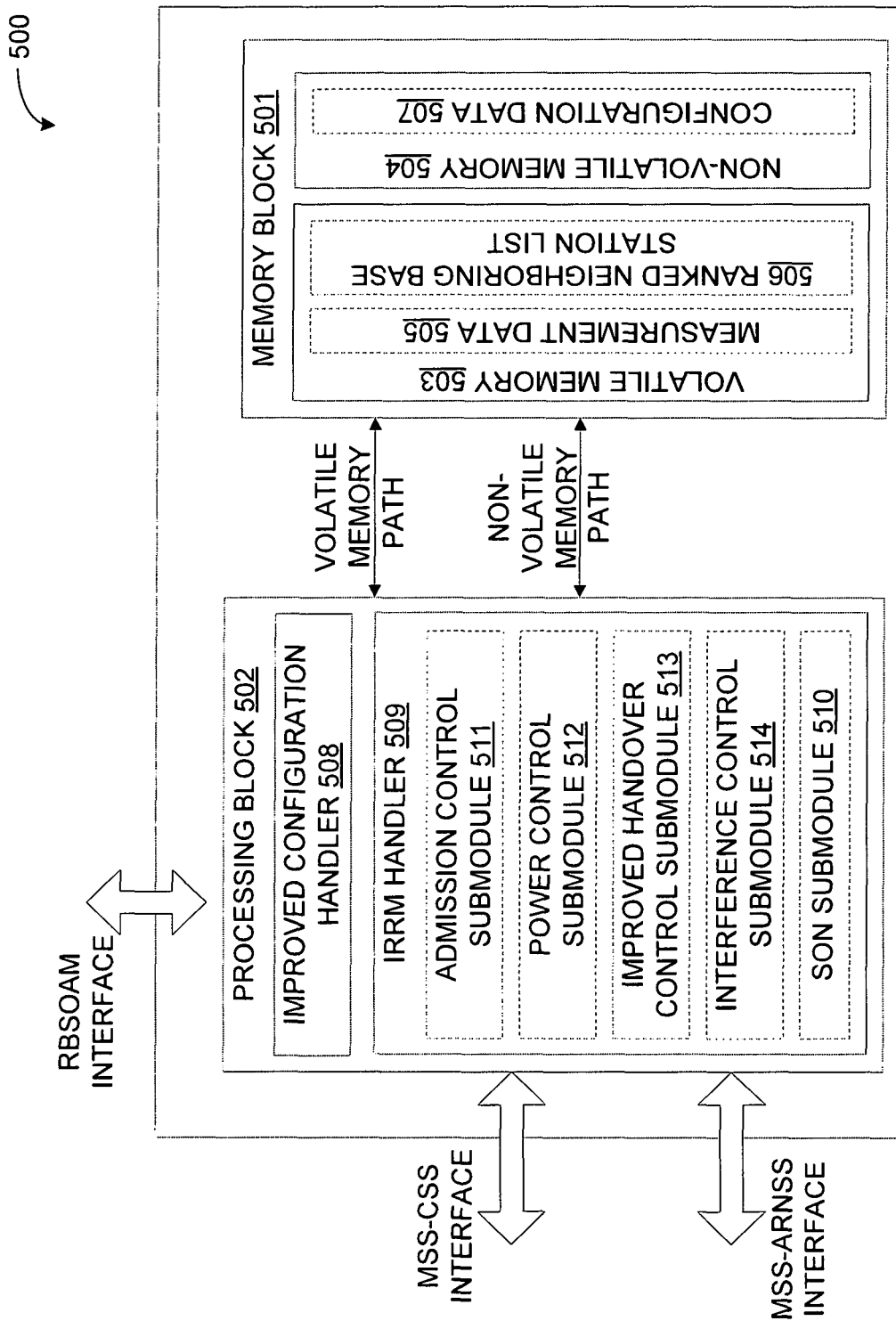
FIG. 5 is a functional block diagram of an exemplary management subsystem that may be employed in the RBS, in accordance with some embodiments of the present disclosure.

Referring now to FIG. 5, a functional block diagram of an exemplary management subsystem (MSS) 500 is illustrated, in accordance with some embodiments of the present disclosure. The MSS 500 is analogous to the MSS 205 implemented by the RBS 201 of FIG. 2. The MSS 500 may include a memory block 501 and a processing block 502. The memory block 501 may include a volatile memory 503 and a non-volatile memory 504. The volatile memory 503 in the MSS 500 may store the system level measurement data 505 provided by the CSS 203. The measurement data 505 may represent the different measurement metrics collected from UE and calculated by CSS 203, DSS 206, and RSS 204. The measurement data 505 may be used to monitor the prevalent radio network condition so as to take appropriate radio network management decisions. Further, the measurement data 505 may be used to take decision by an improved radio resource management (IRRM) handler as discussed below. The volatile memory 503 may further store ranked neighboring base station list 506 provided by the ARNSS 208. As will be appreciated, the ranked neighboring base station list 506 may include an ordered list of neighboring base stations to determine possible handover candidates. The processing block 502 may use volatile memory path to store and retrieve the measurement data 505 from the volatile memory 503. The non-volatile memory 504 in MSS 500 may store the configuration data 507 received from the OAM via the RBSOAM interface. The configuration data 507 may represent the configuration information from the OAM subsystem towards RBS 201, and may be required for configuration, updating existing configuration, instantiation of RBS 201, and so forth. The processing block 502 may access the configuration data 507 and may configure the CSS 203, the DSS 206, and the RSS 204 through a CSS-MSS Interface. It should be noted that a portion of the non-volatile memory may persist across system-start-up cycles. The processing block 502 may use non-volatile memory path to store and retrieve configuration data 507 from the non-volatile memory 504. As will be appreciated, the CSS-MSS interface may be employed to send control instruction and configuration parameters to CSS 203 and to receive the system level measurement data from CSS 203 via the CSS-MSS path. For example, MSS 500 may receive from the OAM and may provide to the CSS 203, following configuration parameters: APPList[ ], $IP_{DNSS}$, $PORT_{DNSS}$, $T_{SmallestMeasurementInterval}$, SupportedKPI[ ], and so forth.

The processing block 502 may include a single processor with the multiple partitions or independent processors working in a group and configured to perform various functions. For example, the processing block 502 may include an improved configuration handler 508 and an IRRM handler 509. The improved configuration handler 508 may handle the overall configuration of the RBS 201. The configuration handler 508 may perform the services and functions, that include, but are not limited to, reception of configuration parameters from OAM and storage of configuration parameters at non-volatile memory during start up, interfacing with the CSS 203, the DSS 206, and the RSS 204, configuration of the CSS 203, the DSS 206, and the RSS 204 with the configuration parameters stored at non-volatile memory, reception of reconfiguration parameters from OAM, reconfiguration of the CSS 203, the DSS 206, and the RSS 204, providing feedback to OAM to help OAM change in, any configuration parameter, and so forth. Additionally, the improved configuration handler 508 may send additional configuration parameters for the DSS 206 so as to generate the KPI's of the RAN.

The IRRM handler 509 may take management decision to efficiently run the RBS 201. The IRRM handler 509 may include a self-organizing network (SON) submodule 510, an admission control submodule 511, a power control submodule 512, an improved handover control submodule 513, and an interference control submodule 514. The SON submodule 510 may perform various functions to (re)organize the RBS 201 in a dynamically changing network topology. These functions include, but are not limited to, physical cell identity (PCI) self-configuration and self-optimization, automatic neighbor relation (ANR) management and X2 link auto creation, cell outage detection, cell coverage optimization, collecting live measurement metrics to provide feedback to the OAM subsystem about current condition of the network, and so forth. It should be noted that any decision is taken based on configuration data and measurement data stored in MSS 205. The admission control submodule 511 may analyze the current network load and the user capability so as to allow the user connectivity into the network. The power control submodule 512 may analyze different network condition to decide on the transmission power that has to be used by the RBS 201. The improved handover control submodule 513 may analyze the measurement data for different neighboring RBS's to decide on the target RBS for the handover purpose. Additionally, the improved handover control submodule 513 may determine a list of neighboring RBS's of the RIBS where the UE is attached (i.e., UE NBR list) upon request from ARNSS 208. As will be appreciated, the UE NBR list include one or more candidate RBS's to which the handover may be triggered. It should be noted that the UE NBR list may not be a ranked list. Additionally, it should be noted that ranking of the UE NBR list may be performed after the execution of at least one round of measurements so as to create a ranked list of neighboring RBS's for possible HO candidates (i.e., ranked target NBR list). Further, it should be noted that the ranking may be refreshed after every measurement and determination of aggregated user application session performance for the serving RBS as well as of its neighboring RBS's. The improved handover control submodule 513 may then perform the UE handover based on the ranked target NBR list sent by the ARNSS 208. The improved handover control submodule 513 may further handle the messages over a MISS-ARNSS interface. It should be noted that the MSS-ARNSS interface may be employed to receive recommended decisions from the ARNSS 208, for optimization of network resources or for improvement of deteriorated UASP's, via the MSS-ARNSS path. The interference control submodule 514 may analyze the measurement data for different neighboring RBS's and reconfigures the RBS to reduce interference from other RBS's.

Figure 6:
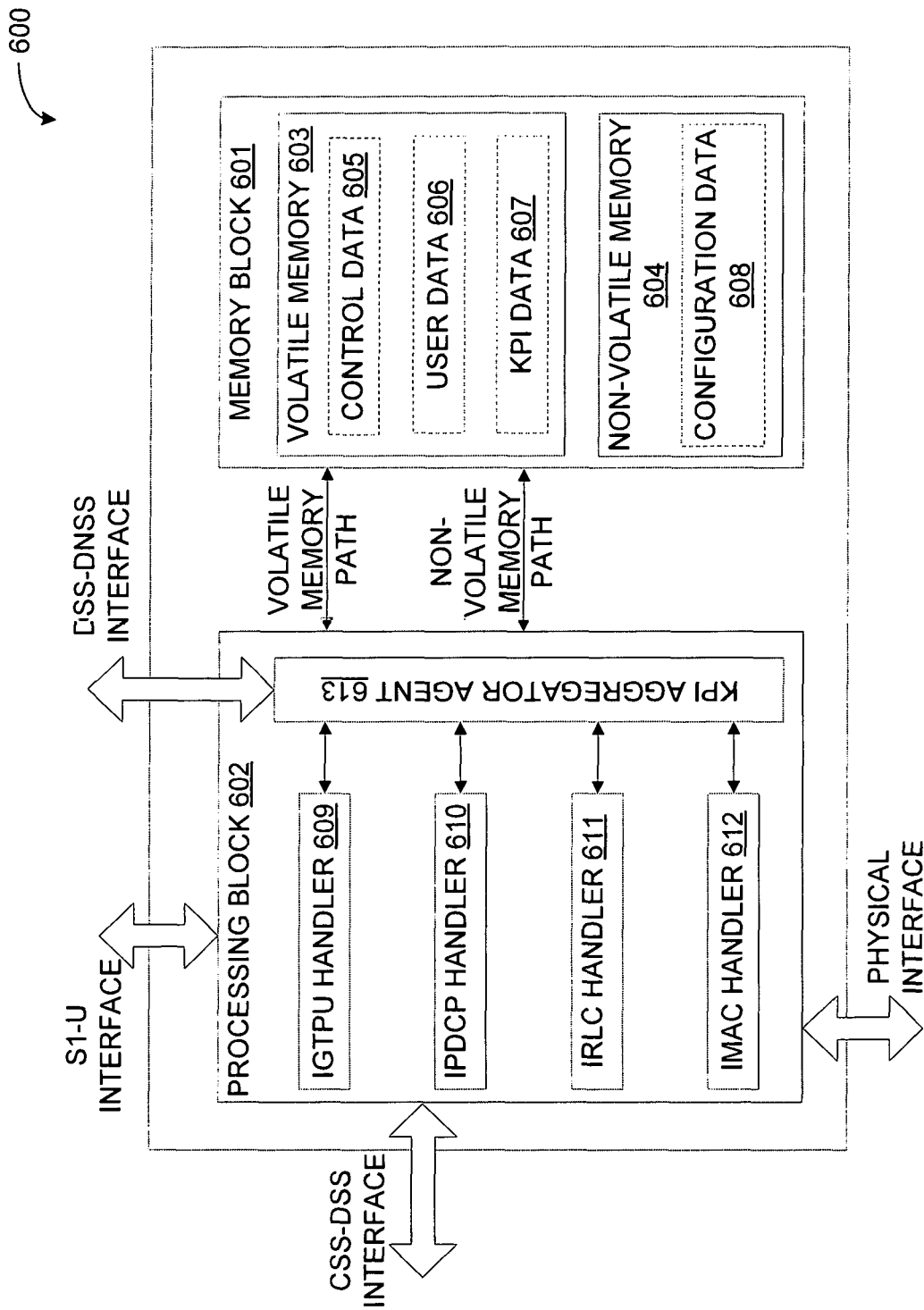
FIG. 6 is a functional block diagram of an exemplary data subsystem that may be employed in the RBS, in accordance with some embodiments of the present disclosure.

Referring now to FIG. 6, a functional block diagram of an exemplary data subsystem (DSS) 600 is illustrated, in accordance with some embodiments of the present disclosure. The DSS 600 is analogous to the DSS 206 implemented by the RBS 201 of FIG. 2. The DSS 600 may include a memory block 601 and a processing block 602. The memory block 601 may include a volatile memory 603 and a non-volatile memory 604. The volatile memory 603 in the DSS 600 may store the control data 605 (i.e., data for controlling the radio access and connection between network and UE), user data 606 (i.e., data specific to user's application data such as voice), and KPI data 607 (i.e., data specific to KPI of RAN at different aggregation levels such as per UE, per UE's Bearer (UB), per user application (UA), etc.). The processing block 602 may use volatile memory path to store and retrieve the control data 605, the user data 606, and the KPI data from the volatile memory 603.

In some embodiments, the KPI data 607 may include user application session specific RAN KPI ($CELLRecord_{RBS}$), which in turn may include a number of parameters. These parameters may include, but may not be limited to, Cell ID ($CEll_{Id}$), Cell level average PRB usage in DL ($CellPrb_{DL}$), Cell level average PRB usage in UL ($CellPrb_{UL}$), Downlink cell level aggregated backhaul throughput ($CellThput_{DL}$), Uplink cell level aggregated backhaul throughput ($CellThput_{UL}$), RBS IP Address ($IpAddr_{RBS}$), Cell level total number of active UE ($ActiveUE_{total}$), Active UE List ($ActiveUE_{List}$[ ]), and De-active UE List ($DeActiveUE_{List}$[ ]). The Active UE List ($ActiveUE_{List}$[ ]) may further include, but may not be limited to, UE Global ID ($UEID_{Global}$), Type of Global ID ($UEID_{GlobalType}$), UE Local ID ($UEID_{Local}$), UE specific CRC error in UL ($UEMacCrc_{DL}$), $UEKPI_{RBS}$ (if UBList[ ] not present), and UE Bearer list (UBList[ ]). The UE Bearer list (UBList[ ]) may include, but may not be limited to, UE Bearer ID ($ID_{Bearer}$), QCI ($QCI_{Bearer}$), UL TIED ($TEID_{UL}$), DL TEID ($TEID_{DL}$), $UEKPI_{RBS}$ (if UASList[ ] is not present), and UE Application List (UASList[ ]). The UE Application List (UASList[ ]) may further include, but may not be limited to, UE APP ID ($ID_{Application}$), UE APP Name ($Name_{Application}$), and $UEKPI_{RBS}$. Similarly, the De-active UE List ($DeActiveUE_{List}$[ ]) may include, but may not be limited to, UE Global ID ($UEID_{Global}$), and UE Bearer list (UBList[ ]). The UE Bearer list (UBList[ ]) may include, but may not be limited to, UE Bearer ID ($ID_{Bearer}$), and UE Application List (UASList[ ]). The UE Application List (UASList[ ]) may further include, but may not be limited to, UE APP ID ($ID_{Application}$), and UE APP Name ($Name_{Application}$).

Additionally, in some embodiments, the KPI data 607 may include UE KPI ($UEKPI_{RBS}$) generated at different aggregation levels (UE, User bearer, User application). As will be appreciated, each UE has different level of KPI generation depending on configuration sent by DNSS. It should be noted that, in some embodiments, only one level of KPI generation is active at any given moment for an UE. The $UEKPI_{RBS}$ may usually include, but may not be limited to, DL PDCP SDU bit-rate ($PdcpBitRate_{DL}$), UL PDCP SDU bit-rate ($PdcpBitRate_{UL}$), DL PDCP SDU drop rate ($PdcpDropRate_{DL}$), UL PDCP SDU loss rate (($PdcpLossRate_{UL}$), UL PDCP SDU Delay ($PpdcpDelay_{UL}$), DL PDCP PDU or RLC SDU Delay($RlcDelay_{DL}$), DL RLC PDU Retransmission ($RlcReTrans_{DL}$), DL PDCP SDU or MAC PDU loss rate over the air ($MacLossRate_{DL}$), DL HARQ re-transmission in DL ($MacHarqReTrans_{DL}$), MAC scheduling rate in DL($MacSchd_{DL}$), CQI in DL($MacCqi_{DL}$), PacketLossCount, LastSequenceNo, avgPacketDelay, and so forth.

The non-volatile memory 604 in DSS 600 may store the configuration data 608 received from CSS 203. As will be appreciated, the configuration data 608 from the CSS 203 may be employed to configure DSS 206 to make it operational, and to perform maintenance of UASP's in the communication network. It should be noted that a portion of the non-volatile memory can persist across system-start-up cycles. The processing block 602 may use non-volatile memory path to store and retrieve configuration data 608 from the non-volatile memory 604. In some embodiments, the configuration data 608 ($CellConfig_{RBS}$) may be updated upon receiving RBS_KPI_COLLECTION_TRIGGER from the DNSS 207. It should be noted that the RBS_KPI_COLLECTION_TRIGGER may contain RBS configuration data ($CellConfig_{RBS}$) for KPI Generation, minimum time required to generate the RAN KPI ($T_{SmallestMeasurementInterval}$), IP Address ($IP_{DNSS}$) of DNSS to send the RAN KPI information to RAS, and UDP/TCP port number ($PORT_{DNSS}$) of DNSS to receive the RAN KPI information. It should be noted that the RBS Configuration Data ($CellConfig_{RBS}$), as received from ARNSS 208, may include a number of parameters including, but not limited to, RBS CELL ID ($CELL_{ID}$), RBS KPI Generation Timer ($TIMER_{KPI\_GENERATION\_INTERVAL\_CELL}$), and List of UE's to be monitored (UEList[ ]). The list of UE's to be monitored (UEList[ ]) may further include, but may not be limited to, UE ID ($ID_{UE}$), UE level KPI Generation Timer ($TIMER_{KPI\_GENERATION\_INTERVAL\_UE}$), and List of UE Bearer (UBList[ ]). The list of UE Bearer (UBList[ ]) may include, but may not be limited to, UE Bearer ID ($ID_{Bearer}$), UE Bearer level KPI Generation Timer ($TIMER_{KPI\_GENERATION\_INTERVAL\_BEARER}$), and Monitored UE Application List (UASLIST[ ]). Further, the Monitored UE Application List (UASLIST[ ]) may include, but may not be limited to, Monitored Application ID ($ID_{Application}$), UE Application level KPI generation timer ($TIMER_{KPI\_GENERATION\_INTERVAL\_APP}$), and Active KPI parameter list(KPIList[ ]). As will be appreciated, the above mentioned parameters of the RBS Configuration Data (CellConfig$_{RBS}$) may be repeated if multiple cells are present in the RBS 201.

The processing block 602 may include a single processor with the multiple partitions or independent processors working in a group and configured to perform various functions. For example, the processing block 602 may include an improved GTP-U (IGTPU) handler 609, an improved PDCP (IPDCP) handler 610, an improved RLC (IRLC) handler 611, and an improved MAC (IMAC) handler 612. Additionally, the processing block 602 may include a KPI aggregator agent 613, in accordance with some embodiments of the present disclosure. The IGTPU handler 609 may receive configuration data from CSS 203 through a CSS-DSS interface, and may configure itself based on the configuration data. Additionally, the IGTPU handler 609 may receive user data from packet core (e.g., SGW) through S1-U interface in downlink (DL) and from the IPDCP handler 610 in uplink (UL). On receiving the data, the IGTPU handler 609 may process the data as per 3GPP TS 29.281 specification. For example, the IGTPU handler 609 may provide tunnel of user traffic between the RBS 201 and the SGW. After processing the received data packets, the IGTPU handler 609 may send the data packets to SGW through S1-U interface in UL and to IPDCP handler 610 in DL. The CSS-DSS interface may be employed to send and receive control and configuration messages to and from the CSS 203 via the CSS-DSS path. Further, in some embodiments, the IGTPU handler 609 may extract GTPU UL TEID ($TEID_{UL}$) and GTPU DL TEID ($TEID_{DL}$) from CSS 203 for the bearer during bearer set-up procedure, and RBS (e.g., eNB) IP address (IpAddr$_{RBS}$) for any data bearer for a user. The RBS 201 may send the extracted parameters in KPI record to RAS 202, which in turn merge the records with S1-U KPI for a user bearer. Further, in some embodiments, the IGTPU handler 609 may generate the downlink cell level aggregated backhaul throughput (CellThput$_{DL}$) and uplink cell level aggregated backhaul throughput (CellThput$_{UL}$).

The IPDCP handler 610 may receive configuration data from CSS 203 through CSS-DSS interface, and may configure itself based on the configuration data. The IPDCP handler 610 may further receive control data from CSS 203 in downlink (DL) and from the IRLC handler 611 in uplink (UL). Additionally, the IPDCP handler 610 may receive user data from GTP-U handler 609 in DL and from the IRLC handler 611 in UL. On receiving the data, the IPDCP handler 610 may process the data as per 3GPP TS 36.323 specification. The IPDCP handler 610 may be responsible for header compression of user data in DL, and for header decompression in UL. The IPDCP handler 610 may also be responsible for ciphering and deciphering of user data and control data as well as for integrity protection of control data in DL, and for integrity verification of control data in UL. Further, the IPDCP handler 610 may be responsible for timer based discard of data packets so as to maintain delay sensitivity of data packet. After processing the received data packets, the IPDCP handler 610 may send the control data to CSS 203, and user data to IGTPU handler 609 in UL, and both control data as well as user data to IRLC handler 611 in DL.

Further, in some embodiments, the IPDCP handler 610 may perform deep packet inspection (DPI) on data packets and identify application from user packet for uplink (UL) and downlink (DL), in accordance with some embodiments of the present disclosure. The IPDCP handler 610 may then add the metadata about the application which may enable the IRLC handler 611 and IMAC handler 612 to generate application session specific KPI in DL. Additionally, in some embodiments, the IPDCP handler 610 may also receive Global UE ID (UEID$_{Global}$), Type of Global ID (UEID$_{GlobalType}$) (e.g., IMSI, TMSI, or GUTI), UE Local ID (UEID$_{Local}$) [C-RNTI], bearer id (ID$_{Bearer}$), QCI$_{Bearer}$ of a bearer, and so forth from the CSS 203 during bearer set up procedure. Further, the IPDCP handler 610 may typically generate various UE application session specific KPI's, in accordance with some embodiments of the present disclosure. These UE application session specific KPI's may include, but may not be limited to, DL PDCP SDU bit-rate (PdcpBitRate$_{DL}$), UL PDCP SDU bit-rate (PdcpBitRate$_{UL}$), DL PDCP SDU drop rate (PdcpDropRate$_{DL}$), UL PDCP SDU loss rate (PdcpLossRate$_{UL}$), and UL PDCP SDU Delay (PdcpDelay$_{UL}$).

The IRLC handler 611 may receive configuration data from CSS 203 through CSS-DSS interface, and may configure itself based on the configuration data. The IRLC handler 611 may further receive control data and user data from the IMAC handler 612 in uplink (UL) and from the IPDCP handler 610 in downlink (DL). On receiving the data, the IRLC handler 611 may process the data as per 3GPP TS 36.322 specification. The IRLC handler 611 may be responsible for segmentation and concatenation of received data packets in DL, and for re-assembly of received data packets in UL. Additionally, the IRLC handler 611 may detect and discard duplicate data packets received in UL. After processing the received data packets, the IRLC handler 611 may send the data packets to the IPDCP handler 610 in UL, and to the IMAC handler 612 in DL. Further, in some embodiments, the IRLC handler 611 may add UE application specific metadata in RLC PDU, in accordance with some embodiments of the present disclosure. The addition of metadata may enable the IMAC handler 612 to identify the user application to generate user application session specific KPI. Moreover, the IRLC handler 611 may typically generate various UE application session specific KPI's, in accordance with some embodiments of the present disclosure. These UE application session specific KPI's may include, but may not be limited to, DL PDCP PDU/RLC SDU Delay (RlcDelay$_{DL}$), DL RLC PDU Retransmission (RlcReTrans$_{DL}$).

The IMAC handler 612 may receive configuration data from CSS 203 through CSS-DSS interface, and may configure itself based on the configuration data. Additionally, the IMAC handler 612 may receive data from IRLC handler 611 in downlink (DL) and from the RSS 204 in uplink (UL) through PHY interface. The PHY interface may include transport channels and may be responsible for exchange of data between RSS 204 and DSS 206. It should be noted that the PHY interface may be hosted along with IMAC handler 612, IRLC handler 611, and IPDCP handler 610 or separately (e.g., in case of C-RAN) based on deployment scenarios. On receiving the data, the IMAC handler 612 may process the data (as per 3GPP TS 36.321 specification) and may perform services and functions that include, but are not limited to, error correction through HARQ, priority handling between UE's by means of dynamic scheduling, priority handling between logical channels of one UE (i.e., logical channel prioritization), and so forth. Additionally, the IMAC handler 612 may be responsible for multiplexing of data packets received from the IRLC handler 611 onto transport blocks (TB) to be delivered to the RSS 204 on transport channels, and for de multiplexing of received transport blocks (TB) delivered from the RSS 204 on transport channels. After processing the received data packets, the IMAC handler 612 may pass the data packets to the RSS 204 in DL and to IRLC handler 611 in UL. Further, in some embodiments, the IMAC handler 612 may typically generate various UE application session specific KPI's, in accordance with some embodiments of the present disclosure. These UE application session specific KPI's may include, but may not be limited to, DL PDCP SDU/MAC PDU loss rate over the air (MacLossRate$_{DL}$), DL HARQ re-transmission in DL (MacHarqReTrans$_{DL}$), UE specific CRC error in UL (UEMacCrc$_{DL}$), UE Application level MAC scheduling rate in DL (MacSchd$_{DL}$), UE Application level CQI in DL (MacCqi$_{DL}$), Cell level average PRB usage in DL (CellPrb$_{DL}$), Cell level average PRB usage in UL (CellPrb$_{UL}$), and Cell level total number of active UE (ActiveUe$_{total}$).

The KPI aggregator agent 613 may exchange RAN KPI's capability information with RAS 202 by RBS_CAPABILITY_NOTIFICATION (ECN). The KPI aggregator agent 613 may also receive RAN KPI's generation and aggregation specification from DNSS 207 by RBS_KPI_COLLECTION_TRIGGER (RKCT). The KPI aggregator agent 613 may then configure the IGTPU handler 609, the IPDCP handler 610, the IRLC handler 611, and the IMAC handler 612 to generate their respective RAN KPI's for the specified duration mentioned in RKCT. As will be appreciated, the IGTPU handler 609, the IPDCP handler 610, the IRLC handler 611, and the IMAC handler 612 may generate RAN KPI at different aggregation levels (per UE, per UE's Bearer (UB), per User-Application (UA), etc.) The KPI aggregator agent 613 may then send the generated RAN KPI's to the DNSS 207 by RBS_KPI_REPORT (RKR).

Figure 7:
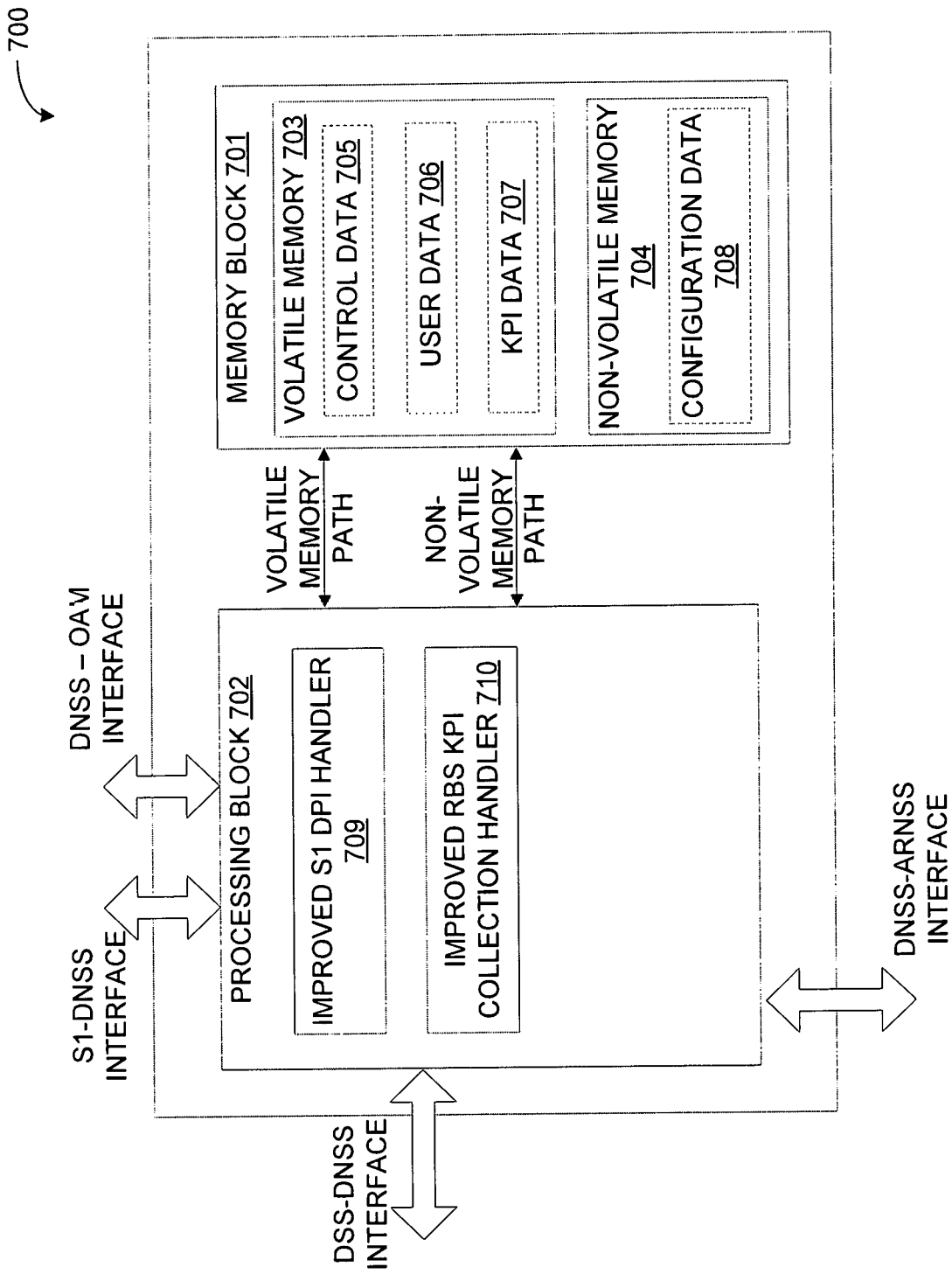
FIG. 7 is a functional block diagram of an exemplary data node subsystem that may be employed in the RAS, in accordance with some embodiments of the present disclosure.

Referring now to FIG. 7, a functional block diagram of an exemplary data node subsystem (DNSS) 700 is illustrated, in accordance with some embodiments of the present disclosure. The DNSS 700 is analogous to the DNSS 207 implemented by the RAS 202 of FIG. 2. The DNSS 700 may include a memory block 701 and a processing block 702. The memory block 701 may include a volatile memory 703 and a non-volatile memory 704. The volatile memory 703 in the DNSS 700 may store tapped control data 705 and tapped user data 706. The processing block 702 may use volatile memory path to store and access the control data 705 and the user data 706. The processing block 702 may analyze the control data 705 and the user data 706 so as to generate radio and IP/application level KPI's. Further, the volatile memory 703 may store the generated KPI data 707. The processing block 702 may use volatile memory path to store and access the generated KPI data 707. As will be appreciated, the control data 705, the user data 706, and the KPI data 707 has been described above in conjunction with FIG. 6. The non-volatile memory 704 in DNSS 700 may store the configuration data 708 received from OAM through DNSS-OAM interface. As will be appreciated, the configuration data 708 from the OAM may be employed to configure DNSS 207 to make it operational. Further, the non-volatile memory 704 in DNSS 700 may store the configuration data 708 received from ARNSS 208 via DNSS-ARNSS interface. The configuration data 708 from the ARNSS 708 may be employed for analyzing data packets so as to generate KPI's. The processing block 702 may use non-volatile memory path to store and retrieve configuration data 708 from the non-volatile memory 704.

In some embodiments, the configuration data 608 may include a number of parameters including, but not limited to, DNSS ID ($ID_{DNSS}$), IP of the ARNSS ($IP_{ARNSS}$), Port no of the ARNSS ($PORT_{ARNSS}$), the smallest time interval for which RBS can capture the KPI's ($T_{SmallestMeasurementInterval}$), Interval after which RKCT is sent to RBS ($T_{KPI\_COLLECTION\_INTERVAL}$), MaxConfigRetry-Count, $T_{RbsKpiConfig}$, List of CELLRecord$_{RBS}$ Radio Base stations supported by the $ID_{RBS}$ and $ID_{CELL}$ (DNSSLIST$_{RBS}$ [ ][ ]), List of aggregated KPI's for network decision suggestion (AGGRLIST$_{RBS}$[ ]), List of KPI's RBS is capable of measuring (List$_{KPI[\ ]}$), Type of packet (UDP/TCP/Others) (TYPE$_{packet}$), Source of the IP packet (PACK_IP-src), Destination of the IP packet (PACK_IP$_{DEST}$), Packet-LossCountUL or PacketLossCountDL (commonly represented as PacketLossCount(UL/DL)), LastSequence-NoUL or LastSequenceNoDL (commonly represented as LastSequenceNo(UL/DL)), or AvgPacketDelayUL or AvgPacketDelayDL (commonly represented as AvgPacketDelay(UL/DL)). It should be noted that if the RBS supports only 1 cell, the DNSSLIST$_{RBS}$ may be a one dimensional array. Further, it should be noted that List$_{KPI[\ ]}$ may be gathered from configuration data in DSS.

The processing block 702 may include a single processor with the multiple partitions or independent processors working in a group and configured to perform various functions. For example, the processing block 702 may include an improved S DPI (IS1DPI) handler 709 and an improved RBS-KPI collection (IRKC) handler 610. The IS1DPI handler 709 may manage interception and tapping of S1 data. In particular, the IS1DPI handler 709 may receive tapped signaling and user data (i.e., tapped S1 data) flowing between the RBS 201 and the core network through S1-DNSS interface via the S1-DNSS path. Additionally, the IS1DPI handler 709 may receive different level of DPI configurations from ARNSS 208 through a DNSS-ARNSS interface via the DNSS-ARNSS path. The IS1DPI handler 709 may then perform deep packet inspection (DPI) on the received S1 data so as to generate IP/Application level KPI's. The IS1DPI handler 709 may further send the generated KPI's to the ARNSS, for consolidation and decision making, through the DNSS-ARNSS interface via the DNSS-ARNSS path. Further, in some embodiments, the IS1DPI handler 709 may employ DPI to determine the user application session specific KPI's from the received uplink and downlink.

The IRKC handler 710 may manage interception and tapping of control and user data of the RBS 201. In particular, the IRKC handler 710 may receive data packets intercepted and tapped from various interfaces of DSS 206 through DSS-DNSS interface via the DSS-DNSS path. As will be appreciated, in some embodiments, the RBS 201 may register itself with RAS 202, which may then configure user application specific KPI generation interval in RBS 201. The RAS 202 may further request the RBS 201 to send the generate KPI's. The RBS 201 may send the generated KPI's to the RAS 202. It should be noted that the IRKC handler 710 may intercept and tap the RBS data by running parallel RAN protocol stack so as to generate high level RAN KPI's. The IRKC handler 710 may then send the generated KPI's to ARNSS 208 for consolidation and decision making. Further, in some embodiments, the IRKC handler 710 may ensure KPI generation in RBS 201 at regular or adaptive intervals as per configuration.

Figure 8:
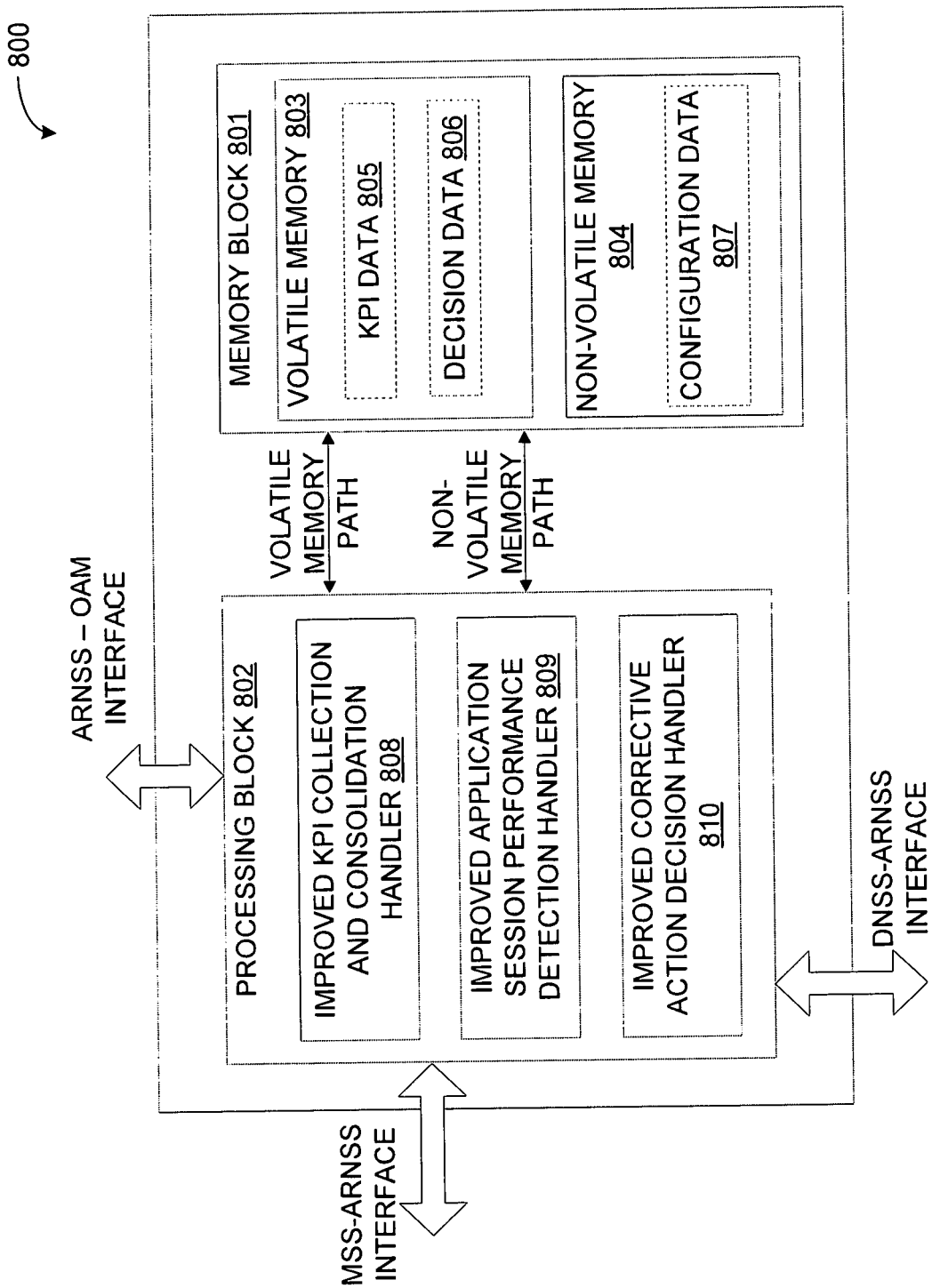
FIG. 8 is a functional block diagram of an exemplary ARN subsystem that may be employed in the RAS, in accordance with some embodiments of the present disclosure.

Referring now to FIG. 8, a functional block diagram of an exemplary analytics and reporting node subsystem (ARNSS) 800 is illustrated, in accordance with some embodiments of the present disclosure. The ARNSS 800 is analogous to the ARNSS 208 implemented by the RAS 202 of FIG. 2. The ARNSS 800 may include a memory block 801 and a processing block 802. The memory block 801 may include a volatile memory 803 and a non-volatile memory 804. The volatile memory 803 in the ARNSS 800 may store KPI data 805 received from the DNSS 207. The volatile memory 803 may also store decision data 806. The decision data 806 may include current decisions that may be used for future decision for optimization of network resources. The processing block 802 may use volatile memory path to store and access the KPI data 805 and the decision data 806. The non-volatile memory 804 in ARNNSS 800 may store the configuration data 807 received from OAM through ARNSS-OAM interface. As will be appreciated, the configuration data 807 from the OAM may be employed to configure ARNSS 208 to make it operational. Further, the non-volatile memory 804 in ARNSS 800 may store different machine learning models that may be employed for determination and optimization of network or user application performance.

In some embodiments, the configuration data 807 may include a number of parameters including, but not limited to, list of DNSS to be supported (List$_{SupportedDNSS}$), list of RBS (LIST$_{RBS}$[Index$_{RBS}$][Index$_{CELL}$]), complete list of applications to be monitored by ARNSS (ListID$_{application}$), a parameter quantitatively representing the threshold value for the acceptable application session performance (ListThreshold$_{app}$), list of UE's to be monitored via the ARNSS (ListID$_{Ue}$ (IMSI)), ith of Monitor_List$_{app}$[i] containing the $i^{th}$ ListID$_{application}$[i] and ListThreshold$_{app}$[i] (Monitor_List$_{app}$), list containing the UE's to be monitored (Monitor_List$_{ue}$), default value of $T_{KPI\_COLLECTION\_INTERVAL}$ (DefaultT$_{KPI\_COLLECTION\_INTERVAL}$), default value of $T_{KPI\_GENERATION\_INTERVAL}$ (DefaultT$_{KPI\_GENERATION\_INTERVAL}$), default value of $T_{TIMERKPI\_GENERATION\_INTERVAL\_UE}$ (DefaultT$_{TIMERKPI\_GENERATION\_INTERVAL\_UE}$), default value of $T_{TIMERKPI\_GENERATION\_INTERVAL\_BEARER}$ (DefaultT$_{TIMERKPI\_GENERATION\_INTERVAL\_BEARER}$), and default value of the $T_{TIMERKPI\_GENERATION\_INTERVAL\_APP}$ (Default$T_{TIMERKPI\_GENERATION\_INTERVAL\_APP}$). Each entry in List$_{SupportedDNSS}$ may further include, but may not be limited to unique ID of the DNSS (ID$_{DNSS}$), IP of the DNSS (IP$_{DNSS}$), and port number of the DNSS (PORT$_{DNSS}$). It should be noted that, for every RBS in the LIST$_{RBS}$ [Index$_{RBS}$][Index$_{CELL}$], the configuration parameters may include UEKPI$_{RBS}$ aggregated at cell level if the KPI metrics is to be calculated at cell level. However, if that is not the case, the configuration parameters may include list of UE's (LIST_UE$_{ARNSS}$[ ]). Additionally, it should be noted that, for every entry in the List_UE$_{ARNSS}$[ ], the configuration parameters may include UEKPI$_{RBS}$ calculated at UE level if the KPI metrics is to be calculated at UE level. However, if that is not the case, the configuration parameters may include list of bearers (UBList[ ]). Further, it should be noted that, for every entry in the UBLIst[ ], the configuration parameters may include UEKPI$_{RBS}$ calculated at UE bearer level if the KPI metrics is to be calculated at UE bearer level. However, if that is not the case, the configuration parameters may include list of UE Application (UASList[ ]). As will be appreciated, initial threshold values in the ListThreshold$_{app}$ may be derived from historical data. Further, as will be appreciated, ListID$_{Ue}$ (IMSI) may be retrieved from HSS. It should be noted that ListID$_{Ue}$ (IMSI) may be optional and all the UEs may be monitored of the same is not provided.

The processing block 802 may include a single processor with the multiple partitions or independent processors working in a group and configured to perform various functions. For example, the processing block 802 may include an improved KPI collection and consolidation (IKCC) handler 808, an improved application session performance detection (IASPD) handler 809, and an improved corrective action decision (ICAD) handler 810. The IKCC handler 808 may collect the KPI's from DNSS 207 through the DNSS-ARNSS interface via the DNSS-ARNSS path. In particular, the IKCC handler 808 may receive the radio, IP, and user application KPI's from the DNSS 207. The IKCC handler 808 may then stich and consolidate received KPI's. For example, the IKCC handler 808 may stich and consolidate the KPI's from different sources based on the common identifiers (e.g. UE ID and RBS ID, timer stamp, etc.). Additionally, in some embodiments, the IKCC handler 808 may use RBS ID, application ID, user ID and bearer ID to consolidate records. It should be noted that consolidation of records may form the data for subsequent analysis at IASPD handler 809.

The IASPD handler 809 may determine user application session performances (UASP's). In some embodiments, the IASPD handler 809 may determine UASP's based on consolidated KPI's using standard mechanism or stored machine learning model. It should be noted that the UASP's may be aggregated at RBS level, bearer level, or user application level based on the configuration for the RBS. The IASPD handler 809 may also determine radio resource usage patterns from the consolidated KPI's for cell in the communication network. Additionally, in some embodiments, the IASPD handler 809 may determine a rate for collection of KPI's based on an analysis of the collected data.

ICAD handler 810 may take the decision and recommend the decision to MSS 205 for optimization of network resource usage or improvement of UASP. For example, the ICAD handler 810 may analyze the trend of UASP's and resource usage pattern of the RBS 201, and the load of neighboring RBS's so to make any decision (i.e., suggest any network actions) for optimization of network resource or improvement of deteriorated UASP's. The ICAD handler 810 may then recommend the decision to MSS 205 through the MSS-ARNSS interface via the MSS-ARNSS data path. In some embodiments, the ICAD handler 810 may receive the UE NBR cell list from IRRM handler in the MSS 205. Additionally, in some embodiments, the ICAD handler 810 may receive measured received signal strength indication (RSSI) values of the cell in the UE NBR cell list. The ICAD handler 810 may then recommend the MSS ranked target NBR list for handover. Further, in some embodiments, the ICAD handler 810 may communicate the adaptive rate of collection of KPI's to the RBS 201. Moreover, in some embodiments, the ICAD handler 810 may communicate, if required, the handover preferences based on the aggregated KPI's to IRRM in the MSS 205.

It should be noted that, apart from above discussed modules and submodules 300-800, some of the other modules, subsystems, or network elements may have to be modified for processing data packets so as to implement and/or provide maintenance of UASP's in the communication network. For example, network elements responsible for providing configuration parameters (e.g., OAM in MME) or modules responsible for effecting the handover (e.g., transceiver in RSS) may be accordingly modified within some embodiments of the present disclosure.

Further, it should be noted that the above discussed subsystems (CSS 300, RSS 400, MSS 500, DSS 600, DNSS 700, ARNSS 800, etc.) and their modules may be implemented in programmable hardware devices such as programmable gate arrays, programmable array logic, programmable logic devices, and so forth. Alternatively, the subsystems and modules may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code may be a single instruction, or many instructions, and may even be distributed over several different code segments, among different applications, and across several memory devices.

As will be appreciated by one skilled in the art, a variety of processes may be employed for maintaining user application session performances (UASP's) in a communication network. For example, the exemplary communication network 100 and the associated system 200 may facilitate maintenance of UASP's by the processes discussed herein. In particular, as will be appreciated by those of ordinary skill in the art, control logic and/or automated routines for performing the techniques and steps described herein may be implemented by components of the communication network 100 and the associated system 200, either by hardware, software, or combinations of hardware and software. For example, a suitable code may be accessed and executed by the one or more processors on the system 200 to perform some or all of the techniques described herein. Similarly, application specific integrated circuits (ASICs) configured to perform some or all of the processes described herein may be included in the one or more processors on the system 200. Additionally, it should be noted that though the process described below focuses on eNB, the process may also be equally applicable to other base station (e.g., Node B) and will follow substantially similar principles with appropriate modifications in the corresponding subsystems.

For example, referring now to FIG. 9, exemplary control logic 900 for maintaining UASP's in a communication network 100 via a system, such as the system 200, is depicted via a flowchart, in accordance with some embodiments of the present disclosure. As illustrated in the flowchart, the control logic 900 may include the steps of determining an aggregate UASP for each of a plurality of users and for each of a plurality of applications at a serving base station (SBS) and at each of a plurality of neighboring base stations (NBS's) based on gathered performance data at step 901, determining an aggregate application performance level for each of the plurality of applications at the SBS and at each of the plurality of NBS's based on the aggregate UASPs for the plurality of users at the SBS and at each of the plurality of NBS's respectively at step 902, and determining an aggregate application performance based on the aggregate application performance levels for the plurality of applications at the SBS and at the plurality of NBS's at step 903. The control logic 900 may further include the step of maintaining the UASPs by applying a determined corrective network action based on an average of aggregate applications performances at the SBS and at each of the plurality of NBS's 904

In some embodiments, determining the aggregate UASP at a given base station (i.e, at the SBS or at one of the NBS's) at step 901 may include the steps of determining a UASP at a core network end of the given base station, determining a UASP at a radio interface end of the given base station, and determining the aggregate UASP at the given base station based on the UASP at the core network end and the UASP at the radio interface end. Additionally, in some embodiments, determining the UASP at the core network end may include the step of determining an association between received packets and a user application session from an uplink packet and a downlink packet using deep packet inspection (DPI). Further, in some embodiments, determining the UASP at the radio interface end may include the step of determining an association between user packets and a user application session using shallow packet inspection. Moreover, in some embodiments, the corrective network action at step 904 may include recommending a handover from SBS to one of the plurality of NBS's based on a comparison among the average of aggregate applications performances for the SBS and each of the plurality of NBS's In some embodiments, the control logic 900 may further include the step of adapting gathering of performance data based on an analysis of trend for a pre-defined number of previous aggregate user application session performances. Additionally, in some embodiments, the control logic 900 may further include the step of determining an accuracy of a previous corrective network action based on the aggregate user application session performance. Further, in some embodiments, the control logic 900 may further include the step of updating or providing recommendations for updating, based on the accuracy, a co-efficient or a threshold value for determination of one or more process parameters.

Figure 10:
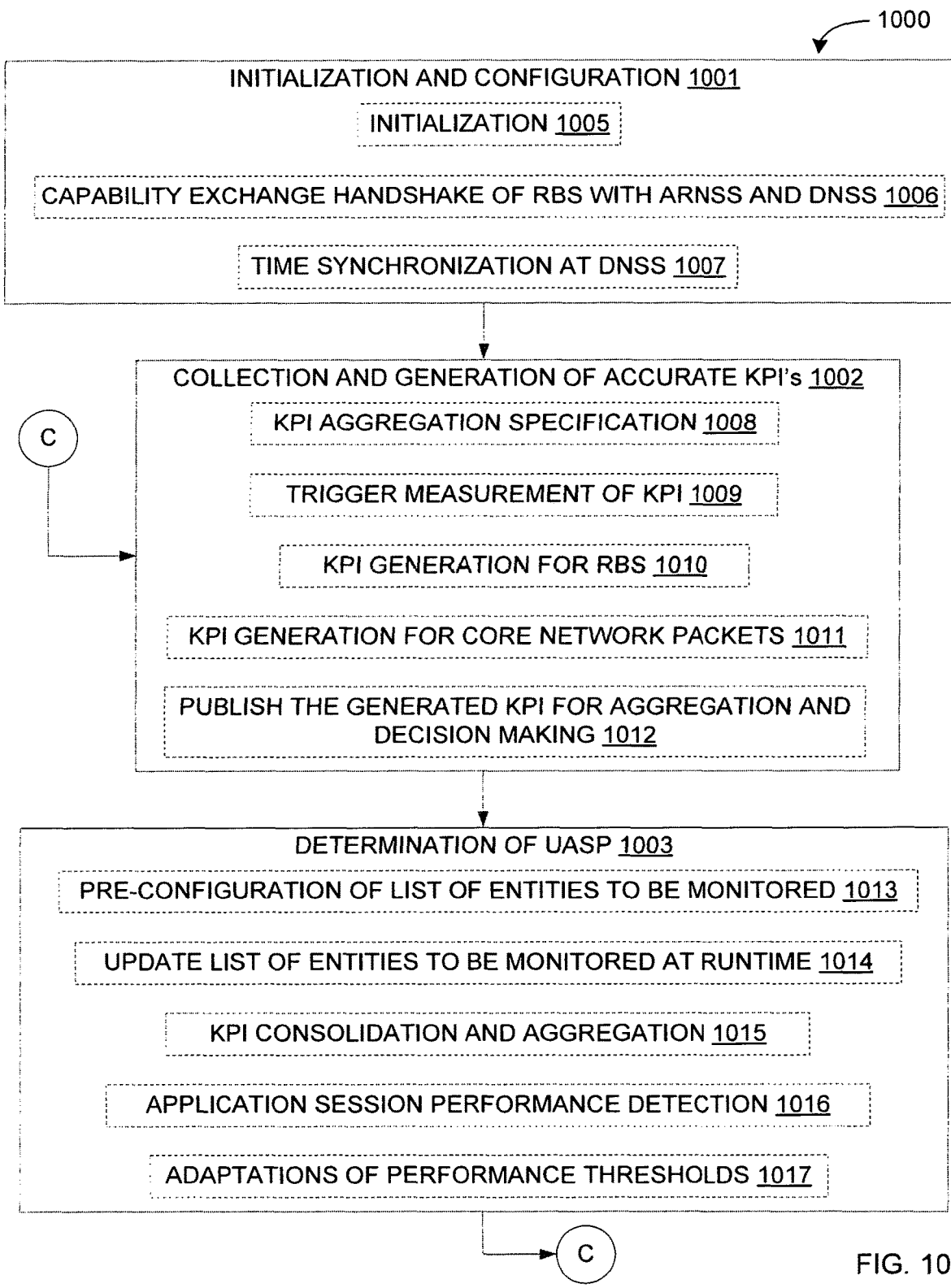
FIG. 10 is a flow diagram of a detailed exemplary process for maintaining user application session performances in a communication network, in accordance with some embodiments of the present disclosure.
Figure 10:
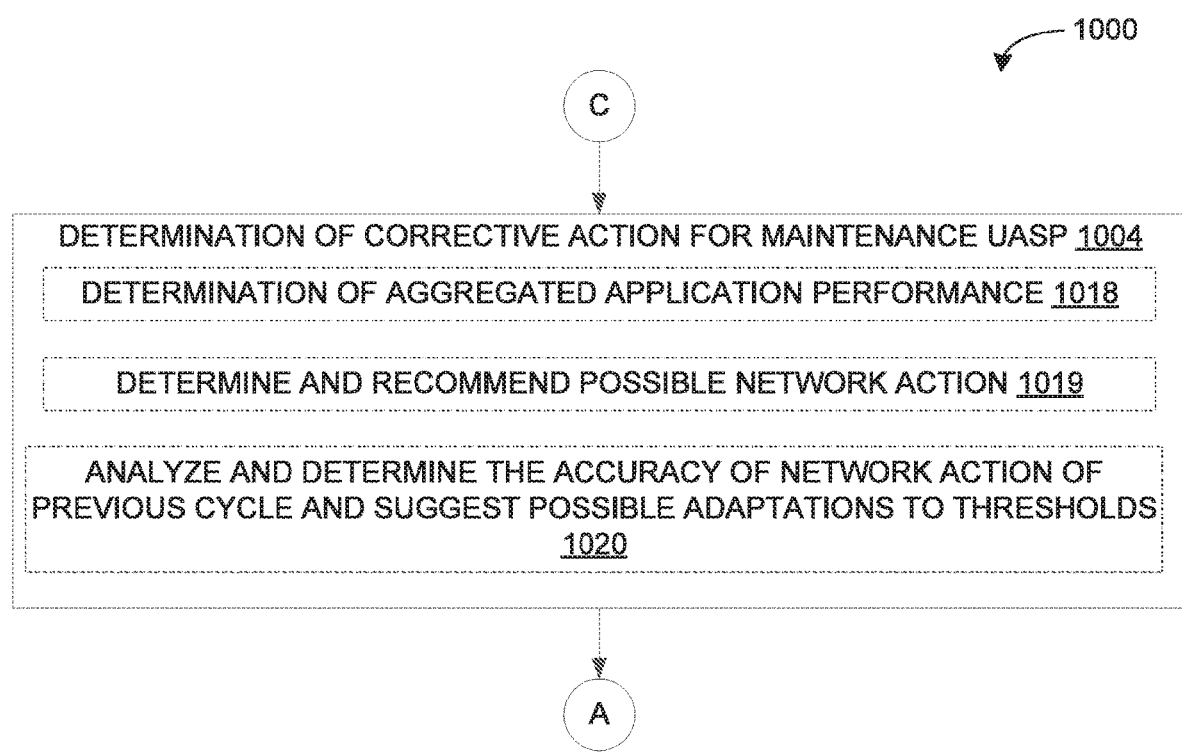

Referring now to FIG. 10, exemplary control logic 1000 for processing data packets for maintaining UASP's in a communication network 100 is depicted in greater detail via a flowchart in accordance with some embodiments of the present disclosure. As illustrated in the flowchart, the control logic 1000 may include the steps of initializing and configuring the RBS and the RAS at step 1001, collecting and generating accurate KPI's at step 1002, determining of UASP based on KPI's at step 1003, and determining corrective for maintenance of UASP at step 1004. Each of these steps will be described in greater detail herein below.

At step 1001, the control logic may further include the steps of initializing the RBS and the RAS at step 1005, performing capability exchange handshake of RBS with DNSS and ARNSS at step 1006, and performing time synchronization at DNSS at step 1007. At step 1005, the RBS 201 may be initialized as per 3GPP TS 32.851 specification and 3GPP TS 36.331 specification. Further, the KPI aggregator agent 613, DNSS 207, and ARNSS 208 may be configured or initialized, in accordance with some embodiments of the present disclosure.

For ARNSS 208 initialization, the IKCC handler 808 in the ARNSS 208 may be spawned and may wait for OAM to send configuration. After the IKCC handler 808 may receive OAM_PRECONFIG_ARNSS_REQUEST containing List$_{SupportedDNSS}$[ ] from OAM through ARNSS-OAM interface, the IKCC handler 808 may configure itself as well as the other ARNSS modules. The IKCC handler 808 may further receive the OAM_CONFIG_ARNSS_REQUEST from ARNSS-OAM Interface. The OAM_CONFIG_ARNSS_REQUEST may include the ID$_{ARNSS}$ along with the LIST_ID$_{DNSS}$ to be monitored. The OAM_CONFIG_ARNSS_REQUEST may also include, but may not be limited to, Default$T_{KPI\_COLLECTION\_INTERVAL}$, Default$T_{KPI\_GENERATION\_INTERVAL}$, Default$_{TIMERKPI\_GENERATION\_INTERVAL\_UE}$, ListThreshold$_{APP}$, Default$_{TIMERKPI\_GENERATION\_INTERVAL\_BEARER}$, Default$_{TIMERKPI\_GENERATION\_INTERVAL\_APP}$, ListID$_{application}$, Monitor_List$_{app}$, and ListID$_{UE}$ (optional). As state above, if the ListID$_{UE}$ is empty, it may be assumed that all the UE's are being monitored.

Similarly, for DNSS 207 initialization, the IRKC handler 710 in the DNSS 207 may wait for OAM_CONFIG_DNSS_REQUEST from OAM through DNSS-OAM interface. The OAM_CONFIG_DNSS_REQUEST may include, but may not be limited to, ID$_{DNSS}$, IP$_{ARNSS}$, PORT$_{ARNSS}$, MaxConfigRetryCount, T$_{RbsKpiConfig}$ and DNSSLIST$_{RBS}$[ ]. Upon receipt, the IRKC handler 710 may configure itself as well as the other DNSS modules. Additionally, the IRKC handler 710 may send the DNSS_ASNSS_LISTRBS_CONFIG_REQUEST to configure the List$_{RBS}$ in ARNSS.

Further, for KPI aggregator agent 613 initialization, the KPI aggregator agent 613 in the DSS 206 may wait for OAM_RBS_KPI_CONFIG_REQUEST containing standard parameters along with ID$_{DNSS}$, T$_{SmallestMeasurementInterval}$, IP$_{DNSS}$ and PORT$_{DNSS}$, ID$_{RBS}$, CELL$_{ID}$, and standard ListKPI[ ] from CSS-DSS interface to send the KPI's upon generation. As will be appreciated, at this point the cell may become operational and UE's may start to attach to it.

At step 1006, the capability notification handshake may be performed. The KPI aggregator agent 613 may send RBS_CAPABILITY_NOTIFICATION using DSS-DNSS interface to DNSS 207. The RBS_CAPABILITY_NOTIFICATION may include, but may not be limited to, ID$_{RBS}$, T$_{SmallestMeasurementInterval}$, ID$_{CELL}$(S), List$_{KPI}$[ ], ActiveUE$_{List}$[ ] and DeActiveUE$_{List}$[ ] (sans UEKPI$_{RBS}$). If any change happens to the ActiveUE$_{List}$[ ] and/or DeActiveUE$_{List}$[ ], the RBS_CAPABILITY_NOTIFICATION may be generated again so as to update the DNSS (DNSS-LIST$_{RBS}$) and ARNSS (LIST$_{RBS}$) with updated UE list. It should be noted that the KPI aggregator agent 613 may give precedence to RBS_CAPABILITY_NOTIFICATION to RKR in case the KPI aggregator agent 613 has to send both simultaneously.

Further, the IRKC handler 710 in the DNSS 207 may receive RBS CAPABILITY NOTIFICATION from the KPI aggregator agent 613. The IRKC handler 710 may then update the DNSSLIST$_{RBS}$ and forward RBS_CAPABILITY_NOTIFICATION to the IKCC handler 808 in the ARNSS 208. The IKCC handler 808 may receive the RBS_CAPABILITY_NOTIFICATION, may update the LIST$_{RBS}$, and may send DNSS_KPI_CONFIGURATION_REQ. The DNSS_KPI_CONFIGURATION_REQ may include, but may not be limited to, ID$_{RBS}$, CELL$_{ID}$(S), T$_{KPI\_GENERATION\_INTERVAL}$, T$_{KPI\_COLLECTION\_INTERVAL}$, List$_{KPI}$[ ], Default$_{TIMERKPI\_GENERATION\_INTERVAL\_UE}$, Default$_{TIMERKPI\_GENERATION\_INTERVAL\_BEARER}$, and Default$_{TIMERKPI\_GENERATION\_INTERVAL\_APP}$ using the ARNSS-DNSS interface to DNSS 207. The T$_{KPI\_COLLECTION\_INTERVAL}$ and T$_{KPI\_GENERATION\_INTERVAL}$ may be initialized by DefaultT$_{KPI\_COLLECTION\_INTERVAL}$ and DefaultT$_{KPI\_GENERATION\_INTERVAL}$ respectively. It should be noted that T$_{KPI\_COLLECTION\_INTERVAL}$>=T$_{KPI\_GENERATION\_INTERVAL}$>=T$_{SmallestMeasurementInterval}$. Additionally, it should be noted that, if the timer values are not following the above relation, the default values may be used instead. Further, it should be noted that the LIST$_{RBS}$[ ] may be either the complete list received in the RBS_CAPABILITY_NOTIFICATION or a subset of it. Upon reception of the DNSS_KPI_CONFIGURATION_REQ at IRKC handler 710 in DNSS 207, the IRKC handler 710 may update DNSSLIST$_{RBS}$[Index$_{RBS}$].ID$_{RBS}$ with ID$_{RBS}$, DNSSLIST$_{RBS}$ [Index$_{RBS}$][Index$_{CELL}$].T$_{KPI\_GENERATION\_INTERVAL}$ with T$_{KPI\_GENERATION\_INTERVAL}$ and DNSSLIST$_{RBS}$[Index$_{RBS}$] [Index$_{CELL}$].T$_{KPI\_COLLECTION\_INTERVAL}$ with T$_{KPI\_COLLECTION\_INTERVAL}$.

While AttemptCount is less than MaxConfigRetryCount, the IRKC handler 710 may start timer TIMER$_{RbsKpiConfig}$ with value T$_{RbsKpiConfig}$ to expect RBS_KPI_CONFIG_COMPLETE. Additionally, RBS_KPI_CONFIGURATION_REQ may be sent to RBS with ID$_{RBS}$, AttemptCount and CellConfig$_{RBS}$[ ]. If RBS_KPI_CONFIG_COMPLETE consisting of ID$_{RBS}$ and AttemptCountRes, is received at DNSS 207 before the expiry of TIMER$_{RbsKpiConfig}$ and AttemptCount is equal to AttemptCountRes, the IRKC handler 710 may stop the timer and exit loop. However, if TIMER$_{RbsKpiConfig}$ expires before reception of the RBS_KPI_CONFIGURATION_REQ or AttemptCount is not equal to AttemptCountRes, then the IRKC handler 710 may determine if AttemptCount is less than MaxConfigRetryCount. If true (i.e., if AttemptCount <MaxConfigRetryCount), the IRKC handler 710 may increase AttemptCount by 1 and repeat the process by restarting timer TIMER$_{RbsKpiConfig}$ with value T$_{RbsKpiConfig}$ to expect RBS_KPI_CONFIG_COMPLETE. However, if not true (i.e., AttemptCount is not <MaxConfigRetryCount), than the IRKC handler 710 may stop further attempts to configure the RBS and may exit the loop as the maximum number of attempts to configure the RBS has been exhausted.

Further, upon receiving RBS_KPI_CONFIGURATION_REQ, the KPI aggregator agent 613 may populate the CellConfig$_{RBS}$ with the parameters received in RBS_KPI_CONFIGURATION_REQ. The KPI aggregator agent 613 may then configure IGTPU handler 609, IPDCP handler 610, IRLC handler 611, and IMAC handler 612 to generate the KPI's as described in CellConfig$_{RBS}$[ ]. Further, the KPI aggregator agent 613 may validate if the configuration procedure is successful. Upon positive validation, the KPI aggregator 613 may send RBS_KPI_CONFIG_COMPLETE to DNSS 207 using DSS-DNSS interface. It should be noted that RBS_KPI_CONFIG_COMPLETE may include message type and ID$_{RBS}$. Upon reception of the RBS_KPI_CONFIG_COMPLETE from multiple RBS's, the IRKC handler 710 in the DNSS 207 may send the DNSS_KPI_CONFIG_COMPLETE to the IKCC 808 handler in the ARNSS 208.

At step 1007, system clock of the DNSS 207 may be synchronized with system clock of SGW using standard method (PTP/NTP). Additionally, system clocks of DNSS 207 and RBS 201 may be synchronized using standard method (PTP/NTP). It should be noted that both of the above mentioned time synchronization procedures may be repeated after a re-defined time interval (T$_{RE-Sync}$), configured by OAM.

At step 1002, the control logic may further include the steps of defining KPI aggregation specification at step 1008, triggering measurement of KPI at step 1009, generating KPI for RBS at step 1010, generating KPI for core network packets at step 1011, and publishing the generated KPI for aggregation and decision making at step 1012.

At step 1008, the IRRC handler 309 may extract global UE ID and type. Upon reception of first message from the UE or handover message from NBS or EPC, IRRC handler 309 may extract the UEID$_{Global}$ and UEID$_{GlobalType}$ present in that message. The IRRC handler 309 may then pass UEID$_{Global}$ and UEID$_{GlobalType}$ along with other standard parameters, while configuring IPDCP handler 610. The IPDCP handler 610 may update identifiers for CELL record and UE record. Further, the IPDCP handler 610 may receive IpAddr$_{RBS}$ and CEll$_{Id}$ during configurations by CSS 203, and may update these in CELLRecord$_{RBS}$[i] during cell configuration. On every UE attach, the CSS 203 may configure IPDCP handler 610, which in turn may update the UEID$_{Global}$ and UEID$_{GlobalType}$ in UERecord$_{RBS}$[i] and ID$_{Bearer}$, QCI$_{Bearer}$ in UERecord$_{RBS}$[i].UBList[j]. The IPDCP handler 610 may update the UEID$_{Global}$ in CELLRecord$_{RBS}$[i].ActiveUE$_{List}$[i] and ID$_{Bearer}$, QCI$_{Bearer}$ in CELLRecord$_{RBS}$[i].ActiveUE$_{List}$[j].UBList[k]. Additionally, after configuration by CSS 203, the IGTPU handler 609 may update TEID$_{UL}$ and TEID$_{DL}$ in UERecord$_{RBS}$[i].UBList [j]. Further, the IPDCP handler 610 may determine the user application name (Name$_{Application}$) from the received user packet using standard DPI mechanism by UE/Application IP, port no and content of the received packet. The IPDCP handler 610 may also determine ID$_{Application}$ against the supported APPList[ ] received during its configuration by CSS 203. It should be noted that APPList[ ] may include list for Name$_{Application}$ and ID$_{Application}$. If Name$_{Application}$ and ID$_{Application}$ is not present in UERecord$_{RBS}$[i].UBList [j].UASList[ ], then the IPDCP handler 610 may update Name$_{Application}$ and ID$_{Application}$ in UERecord$_{RBS}$[i].UBList [i].UASList[j] for UERecord$_{RBS}$ in CELLRecord$_{RBS}$[i].ActiveUE$_{List}$[j]. It should be noted that, based on the gathering granularity, UERecord$_{RBS}$ may be at the UE, UE bearer, or UE Bearer Application level. The IPDCP handler 610 may then generate RBS_CAPABILITY_NOTIFICATION to update DNSS about the updated UE list.

At step 1009, the IRKC handler 710 may start timer TIMER$_{RbsKpiConfig}$ with value DNSSLIST$_{RBS}$[Index$_{RBS}$][Index$_{CELL}$].T$_{KPI\_COLLECTION\_INTERVAL}$ for each Index$_{CELL}$ in DNSSLIST$_{RBS}$[Index$_{RBS}$][Index$_{CELL}$] for each Index$_{RBS}$, in DNSSLIST$_{RBS}$[Index$_{RBS}$] in the DNSS 207. The IRKC handler 710 may then create the RBS_KPI_COLLECTION_TRIGGER (RKCT) towards the RBS represented by Index$_{RBS}$. If ListPreConfiguredUE[ID$_{RBS}$][ ] and ListPreConfigApps[ID$_{RBS}$][ ] are empty, then IRKC handler 710 may populate the list with all the active UE's and all the active applications. Otherwise only populate the RKCT with the active UE's and active applications which are present in the ListPreConfiguredUE[$ID_{RBS}$][ ] and ListPreConfigApps [$ID_{RBS}$][ ]. It should be noted that the RKCT may contain $DNSSLIST_{RB}[Index_{RBS}][Index_{CELL}].CELL_{ID}$, $DNSSLIS-T_{RBS}[Index_{RBS}][Index_{CELL}].T_{KPI\_GENERATION\_INTERVAL}$ and UEList[ ].

Further, the IRKC handler 710 may determine if $DNSSLIST_{RBS}[Index_{RBS}][Index_{CELL}].ActiveUEList[ ]$ includes one or more entries. If true, then, for every $Index_{UE}$ present in $DNSSLIST_{RBS}[Index_{RBS}][Index_{CELL}].ActiveUEList[ ]$, the IRKC handler 710 may insert the $DNSSLIST_{RBS}[Index_{RBS}][Index_{CELL}].ActiveUEList[Index_{UE}].ID_{UE}$ followed by the UE level KPI Generation Timer. The IRKC handler 710 may then determine if $DNSSLIST_{RBS}[Index_{RBS}][Index_{CELL}].ActiveUEList[Index_{UE}].UBList[ ]$ includes one or more entries. If true, then, for every active bearer in $DNSSLIST_{RBS}[Index_{RBS}][Index_{CELL}].ActiveUEList[Index_{UE}].UBList[ ]$, the IRKC handler 710 may insert the UE Bearer ID ($ID_{Bearer}$) and the bearer level timer ($TIMER_{KPI\_GENERATION\_INTERVAL\_UB}$) for the bearer in the RKCT for each entry in the $DNSSLIST_{RBS}[Index_{RBS}][Index_{CELL}].ActiveUEList[Index_{UE}].UBList[ ]$. The IRKC handler 710 may further determine if $DNSSLIST_{RBS}[Index_{RBS}][Index_{CELL}].ActiveUEList[Index_{UE}].UBList[Index_{Bearer}].UASLI ST[ ]$ include one or more entries. If true, then, the IRKC handler 710 may determine that user application specific KPI collection is required. For every $Index_{app}$, the IRKC handler 710 may insert the UE Application ID ($DNSSLIST_{RBS}[Index_{RBS}][Index_{CELL}].ActiveUEList[Index_{UE}].UBList[Index_{Bearer}].UASLIST[Index_{app}].ID_{Application}$) and UE Application level KPI generation timer ($DNSSLIST_{RBS}[Index_{RB}][Index_{CELL}].ActiveUEList[Index_{UE}].UBList[Index_{Bearer}].UASLIST[Index_{app}].TIMER_{KPI\_GENERATION\_INTERVAL\_APP}$). However, if false, then, as per the case, the IRKC handler 710 may continue to the next Bearer in the $DNSSLIST_{RBS}[Index_{RBS}][Index_{CELL}].ActiveUEList[Index_{UE}].UBList[ ]$ or to the next UE in $DNSSLIST_{RBS}[Index_{RBS}][Index_{CELL}].ActiveUEList[ ]$ or may not include any UE specific parameters.

Upon expiry of the $TIMER_{RbsKpiConfig}$, the IRKC handler 710 may send the RKCT towards the RBS cell represented by $Index_{RBS}$ and $Index_{CELL}$. The IRKC handler 710 may then continue to the next $Index_{CELL}$ till all the $Index_{CELL}$ in $DNSSLIST_{RBS}[Index_{RBS}][Index_{CELL}]$ are parsed. Further, the IRKC handler 710 may parse to the next $Index_{RBS}$ in $LIST_{RBS}[Index_{RBS}]$. After parsing all the $Index_{RBS}$ in $DNSSLIST_{RBS}[Index_{RBS}]$, the IRKC handler 710 may restart the parsing.

At step 1010, the KPI aggregator agent 613 may check the $CELL_{ID}(S)$ in RKCT upon reception of RBS_KPI_COLLECTION_TRIGGER (RKCT) using DSS-DNSS interface. If, $CELL_{ID}$ matches with Cell-ID(s) configured for the RBS 201, the KPI aggregator agent 613 may continue with the data collection, else the KPI aggregator agent 613 may ignore the message RKCT. For data collection, the KPI aggregator agent 613 may extract the $T_{KPI\_GENERATION\_INTERVAL}$ as well as other configurations from RKCT. The extracted configuration may be stored in $CellConfig_{RBS}$. The KPI aggregator agent 613 may then start a timer $TIMER_{KPI\_GENERATION\_INTERVAL}$ with the value $T_{KPI\_GENERATION\_INTERVAL}$ and may trigger KPI generation through the IGTPU handler 609, the IPDCP handler 610, the IRLC handler 611, and the IMAC handler 612. As will be appreciated, the IGTPU handler 609, the IPDCP handler 610, the IRLC handler 611, and the IMAC handler 612 may generate the individual RBS and/or UE application specific KPI's. Further, the IMAC handler 612 and the IPDCP handler 610 may generate $CELLRecord_{RBS}$. First, the IMAC handler 612 may generate the CellPrbDL and CellPrbDL for total PRB usage computation and update in $CELLRecord_{RBS}$ [i]. The IPDCP handler 610 may then generate CellThputDL and CellThputUL for data volume computation on per cell basis and update in $CELLRecord_{RBS}$[i]. The generation of $UEKPI_{RBS}$ may happen in three levels (user level, user bearer level, and user application level) based on request (in RKCT). It should be noted that only one level of $UEKPI_{RBS}$ generation may be possible at any given moment.

Further, the KPI aggregator agent 613 may verify presence of UE's in ActiveUEList[ ] of RKCT request. If the KPI aggregator agent 613 may find presence of same UE in the $ActiveUE_{List}[ ]$ of the KPI aggregator agent 613, then further information may need to be extracted from RKCT. The KPI aggregator agent 613 may extract the relevant bearer list ($ActiveUE_{List}[i].UBList[ ]$) from the RKCT. The KPI aggregator agent 613 may then extract relevant user-application-session-list from the RKCT ($ActiveUE_{List}[i].UBList[i].UAList[ ]$) for each relevant bearer. Further, the KPI aggregator agent 613 may start timer with duration $TIMER_{KPI\_GENERATION\_INTERVAL\_APPLICATION(i)}$ (received via RKCT), and may generate $UEKPI_{RBS}$ as per following logic:

```
In a loop for per UE per bearer, IF ActiveUE_List[i].UBList[ ] is
present in parsed request from RKCT:
  In a loop per UE per bearer per application, IF
  ActiveUE_List[i].UBList[i].UAList [ ] is present in parsed request
  from RKCT:
    IF ID_Application retrieved from AciveUE_List[i].UBList[i].UASList
[i]
    (from RKCT) matches with ID_Application in UERecord_RBS[i].UB-
List
    [i].UASList[ ]:
      The KPI aggregator agent 613 starts timer for duration
      TIMER_KPI_GENERATION_INTERVAL_APPLICATION(i)
      (received RKCT) and generate UEKPI_RBS as per following
      logic:
        On receive of user packet for UEList[i].UBList[i], the
        IPDCP handler 610 determines the ID_Application (i)
        IF determination of ID_Application(i) is successful,
          The IPDCP handler 610 adds ID_Application(i) as meta-
          data to the received packet in downlink;
          The IRLC handler 611 and the IMAC handler uses
          this ID_Application(i) for the received packet to generate
          the user-application specific KPI's;
          The IMAC handler 612 removes this meta-data
          from the packet before sending it PHY;
          Generate UEKPI_RBS (as per logic described in
          Generate UEKPI_RBS below) for user-application
          level (i.e., per user per bearer per application)
        ELSE, continue
    ELSE, IF ID_Bearer retrieved from UEList[i].UBList[i] (from
    RKCT) matches ID_Bearer in UERecordsList[i].UBList[ ]
      The KPI aggregator agent 613 starts timer for
      duration TIMER_KPI_GENERATION_INTERVAL_Bearer(i)
      (received in RKCT);
      Generate UEKPI_RBS (as per logic described in
      Generate UEKPI_RBS below) for user-bearer level
      (i.e., per user per bearer)
    ELSE, continue
  ELSE, continue
  ELSE, IF ID_UE retrieved from UEList[i] (in RKCT) matches
  UEID_Global in UERecord_RBS[ ]
    The KPI aggregator agent 613 starts timer for duration
    TIMER_KPI_GENERATION_INTERVAL_UE(i) (received in RKCT);
    Generate UEKPI_RBS (as per logic described in Generate
    UEKPI_RBS
    below) for user level (i.e., per user)
  ELSE, continue
ELSE, continue.
```

Further, the control logic 1000 may generate user application specific KPI's as per logic Generate UEKPI$_{RBS}$. Based on the requested aggregation level (i.e., '1' for per UE, '2' for per UE per bearer, '3' for per UE per bearer per application, etc.) to generate KPI's, the IPDCP handler 610, the IRLC handler 611, and the IMAC handler 612 may generate a number of KPI's. For example, based on the configurations present in CellConfig$_{RBS}$, the IPDCP handler 610 may compute following KPI's, at requested KPI aggregation level: DL PDCP SDU bit-rate (PdcpBitRate$_{DL}$), DL PDCP SDU drop rate (PdcpDropRate$_{DL}$), UL PDCP SDU bit-rate (PdcpBitRate$_{UL}$), and UL PDCP SDU loss rate (PdcpLossRate$_{UL}$). At a requested KPI aggregation level, the IPDCP handler 610 may then compute UL PDCP SDU Delay (PpdcpDelay$_{UL}$) as per equation (1) below:

$$(\Sigma(\text{ArrivalTimeRcvdPSUL}_{(i)} - \text{SourceTime-PSRcvdUL}_{(i)}))/\text{TotalRcvdSDU} \quad \text{Equation (1)}$$

where ArrivalTimeRcvdPSUL(i) is arrival time of 'i'th PDCP SDU at IPDCP handler 610 and SourceTimePSRcvdUL$_{(i)}$ is departing time for ith PDCP SDU from UE PDCP from IPDCP handler 610. It should be noted that TotalRcvdSDU is incremented by one upon receiving of each PDCP SDU at IPDCP handler 610.

Additionally, for example, the IRLC handler 611 may generate following KPI at requested KPI aggregation level: DL PDCP PDU/RLC SDU Delay (RlcDelay$_{DL}$). Further, for example, the IMAC handler 612 may generate following KPI's at requested KPI aggregation level: DL PDCP SDU/MAC PDU loss rate over the air (MacLossRate$_{DL}$), DL HARQ re-transmission in DL (MacHarqReTrans$_{DL}$), UE Application level CQI in DL (MacCqi$_{DL}$), UE Application level MAC scheduling rate in DL (MacSchd$_{DL}$). The IMAC handler 611 may also compute UEMacCrc$_{DL}$ per UE as total number of CRC error packets received per requested level. In particular, the UEMacCrcDL may be incremented by one on receipt of each CRC error packet. Further, at a requested KPI aggregation level, the IMAC handler 612 may compute KPI MacSchd$_{DL}$ as a total number of packet scheduling for requested aggregation level by IMAC handler 612. In particular, the MacSchdDL may be incremented by one on each scheduling of a downlink packet for requested aggregation level.

Further, if requested aggregation level per user, the IPDCP handler 610, the IRLC handler 611, and the IMAC handler 612 may update computed UEKPI$_{RBS}$ in ActiveUE$_{List}$[i]. Alternatively, if requested aggregation level per user per bearer, the IPDCP handler 610, the IRLC handler 611, and the IMAC handler 612 may update computed UEKPI$_{RBS}$ in ActiveUE$_{List}$[i].UBList [i]. Further, the KPI aggregator agent 613 may extract computed CELLRecord$_{RBS}$ on expiry of CELLRecord$_{RBS}$ KPI generation timer and put it in CellRecordSendReadyList[ ] before sending the same to the DNSS 207. It should be noted that the representation of CellRecordSendReadyList is same as CELLRecord$_{RBS}$. Similarly, the KPI aggregator agent 613 may extract computed UEKPI$_{RBS}$ on expiry of UEKPI$_{RBS}$ KPI generation timer and put it in UERecordsSendReadyList[ ] before sending the same to the DNSS 207. Again, it should be noted that the representation of UERecordsSendReadyList is same as UERecord$_{RBS}$. Upon expiry of TIMER$_{KPI\_GENERATION\_INTERVAL}$ timer, the KPI aggregator agent 613 may prepare the RKR and send it to the DNSS 207 over the DSS-DNSS interface. It should be noted that, the RKR may include ID$_{RBS}$, CELL$_{ID}$, CellKPI$_{present}$, UEKPI$_{present}$, followed by CELLRecord$_{RBS}$ and/or UERecord$_{RBS}$. The IRKC handler 710 may check if UE specific KPI is required as per RBS_KPI_COLLECTION_TRIGGER. If required, the IRKC handler 710 may append UEKPI$_{identifier}$ (which may indicate the start of UE specific parameters for that RBS) to RBS_KPI_REPORT (RKR), followed by ID$_{ue}$ and UEKPI$_{RBS}$ defined in memory block of DSS 206. However, if not required, UE specific parameters may not be appended to RKR.

At step 1011, the IRKC handler 710 may check if RBS_KPI_COLLECTION_TRIGGER contain the UE list. If UE list is not present, UE application specific KPI's may not be computed. In this case, all the packets arriving via S1-DNS interface for the ID$_{RBS}$ may be rejected. However, if UE list is present in RBS_KPI_COLLECTION_TRIGGER, the IS1DPI handler 709 may start TIMER$_{S1\_KPI\_GENERATION\_INTERVAL}$ with the value T$_{KPI\_GENERATION\_INTERVAL}$ after IRKC handler 710 sends the RBS_KPI_COLLECTION_TRIGGER. Further, if the packet is intended for an UE that is not being monitored or for an application that is not being monitored, the IRKC handler 710 may discard the packet. Similarly, if the packet is not intended for the RBS 201 being probed, the IRKC handler 710 may discard the packet. The IS1DPI handler 709 may then collect S U data over S1-DNSS interface till TIMER$_{S1\_KPI\_GENERATION\_INTERVAL}$ expires. In such case, upon reception of the S1U packet data, standard DPI techniques are applied on the received packet in the IS1DPI handler 709 to identify the packet details. It should be noted that, packet details may include, but may not be limited to, TYPE$_{packet}$ (Application type), SEQ$_{NUMBER}$ (of the Application, Bearer, or UE packet), T$_{SENT\_TIME}$, T$_{RECV\_TIME}$, PACK_IP$_{SRC}$, and PACK_IP$_{DEST}$, UL$_{TEID}$, and DL$_{TEID}$.

Further, the IS1DPI handler 709 may check if the IP of the RBS for which the DNSS 207 has sent the RBS_KPI_COLLECTION_TRIGGER matches PACK_IP$_{DEST}$ of the inspected packet from S1-DNS interface, and may determine whether it is uplink packet or downlink packet. The IS1DPI handler 709 may then calculate specific KPI's based on the packet direction. In particular, the IS1DPI handler 709 may find out, by using standard DPI techniques, if the packet is intended for a particular UE and may determine ID$_{UE}$. Similarly, the IS1DPI handler 709 may find out, by using standard DPI techniques, if the packet is intended for a particular bearer or a particular application and may determine ID$_{S1UBEARER}$ and ID$_{S1UAPP}$. The IS1DPI handler 709 may also calculate the time delay taken by the received packet T$_{PACK\_DELAY}$ assuming the S1U DNSS and RBS clocks are in sync.

The IS1DPI handler 709 may then check if the RKCT include UEList[ ] having one or more values. If true, then, for each ID$_{UE}$ in RKCT, the IS1DPI handler 709 may check if the ID$_{UE}$ include one or more UE bearers in UBList[ ]. If true, then for each ID$_{Bearer}$ present in the UBList[ ], the IS1DPI handler 709 may check if the ID$_{Bearer}$ include one or more ID$_{App}$ in the RKCT. If there are one or more ID$_{App}$ in the RKCT, the IS1DPI handler 709 may determine that application specific parameters are being monitored. However, if there are no ID$_{App}$ in the RKCT, the IS1DPI handler 709 may determine that bearer specific parameters are being monitored. Further, if there are no UE bearers in UBList[ ], the IS1DPI handler 709 may determine that only UE specific KPI's are being monitored. Moreover, if there are no ID$_{UE}$ in the UEList[ ], the IS1DPI handler 709 may determine that UE specific KPI's are not being generated, and, therefore, may ignore the S1U packets from or to the ID$_{RBS}$.

Upon determining that application specific parameters are being monitored, the IS1DPI handler 709 may update PacketLossCount(UL/DL), LastSequenceNo(UL/DL), AvgPacketDelay(UL/DL), etc. in the DNSSLIST$_{RBS}$[Index$_{RBS}$][Index$_{CELL}$].ActiveUEList[Index$_{ue}$].UBList[Index$_{Bearer}$].UASList[Index$_{App}$].UEKPI$_{RBS}$ structure. The PacketLossCount(UL/DL), may be calculated as per equation (2) below. Additionally, the LastSequenceNo(UL/DL) may be measured by CurrentSEQ$_{NUMBER}$. Further, the AvgPacketDelay(UL/DL) may be calculated as per equation (3) below.

$$(\text{Current PacketLossCount(UL/DL) for the UE or UE Bearer} + (\text{CurrentSEQ}_{NUMBER} - \text{LastSequenceNo})) \quad \text{Equation (2)}$$

$$(T_{PACK\_DELAY} + (\text{AvgPacketDelay(UL/DL)}) \times (\text{CurrentSEQ}_{NUMBER} - 1)) / \text{CurrentSEQ}_{NUMBER} \quad \text{Equation (3)}$$

Upon determining that bearer specific parameters are being monitored, the IS1DPI handler 709 may update PacketLossCount(UL/DL), LastSequenceNo(UL/DL), AvgPacketDelay(UL/DL) etc. in the DNSSLIST$_{RBS}$[Index$_{RBS}$][Index$_{CELL}$].UEList[Index$_{ue}$]. UBList[Index$_{Bearer}$].UEKPI$_{RBS}$ structure. It should be noted that the parameters may be determined in a similar fashion as those for application specific monitoring with the granularity of the measurement of the parameters being per Bearer. Similarly, upon determining that only UE specific KPI's are being monitored, the IS1DPI handler 709 may update PacketLossCount(UL/DL), LastSequenceNo(UL/DL), AvgPacketDelay(UL/DL) etc. in the DNSSLIST$_{RBS}$[Index$_{RBS}$][Index$_{CELL}$].UEList[Index$_{ue}$]. UEKPI$_{RBS}$ structure. In this case, the cumulative PacketLossCount(UL/DL), may be calculated as per equation (4) below. Additionally, the LastSequenceNo(UL/DL) may be updated by CurrentSEQ$_{NUMB}$ER. Further, the AvgPacketDelay(UL/DL) may be calculated as per equation (5) below.

$$(\text{Current PacketLossCount(UL/DL)} + (\text{CurrentSEQ}_{NUMBER} - \text{LastSequenceNo})) \quad \text{Equation (4)}$$

$$(T_{PACK\_DELAY} + (\text{previous AvgPacketDelay(UL/DL)}) \times (\text{CurrentSEQ}_{NUMBER} - 1)) / \text{CurrentSEQ}_{NUMBER} \quad \text{Equation (5)}$$

At step 1012, upon reception of RKR at IRKC handler 710 in the DNSS 206, IRKC handler 710 may process the received RKR and forward the RKR to the IKCC handler 808 in the ARNSS 208. Further, the IS1DPI handler 709 may send the S1DPI_REPORT to the IKCC handler 808 in the ARNSS 208. The IKCC 808 may then verify the RKCT for a non-empty UEList[ ]. If one or more entries exist, then for each ID$_{UE}$ in the UEList[ ], the IKCC handler 808 may insert DNSSLIST$_{RBS}$[Index$_{RBS}$][Index$_{CELL}$].LIST$_{ue}$[Index$_{ue}$].ID$_{UE}$ in the S1DPI_REPORT. The IKCC 808 may then verify the RKCT for a non-empty UBList[ ]. If one or more entries exist, then for each ID$_{Bearer}$ present in UBList[ ], the IKCC handler 808 may insert DNSSLIST$_{RBS}$ [Index$_{RBS}$][Index$_{CELL}$].UEList[Index$_{ue}$].UBList[Index$_{Bearer}$].ID$_{Bearer}$ in the S1DPI_REPORT. The IKCC 808 may then verify the RKCT for a non-empty UASLIST[ ]. If one or more entries exist, then for each Index$_{app}$ in UASLIST[ ], the IKCC handler 808 may insert DNSSLIST$_{RBS}$[Index$_{RBS}$][Index$_{CELL}$].UEList[Index$_{ue}$].UBList[Index$_{Bearer}$]. UASList[Index$_{App}$].ID$_{Application}$, and PacketLossCount(UL/DL) and AvgPacketDelay(UL/DL) from DNSSLIST$_{RB}$[Index$_{RBS}$][Index$_{CELL}$].UEList[Index$_{ue}$].UBList[Index$_{Bearer}$].UASList[Index$_{App}$].UEKPI$_{RBS}$, in S1DPI_REPORT and continue to the next Index$_{APP}$. However, if UASLIST[ ] is empty, the IKCC handler 808 may insert the PacketLossCount(UL/DL) and AvgPacketDelay(UL/DL) from DNSSLIST$_{RBS}$[Index$_{RBS}$][Index$_{CELL}$]. UEList[Index$_{ue}$].UBList[Index$_{Bearer}$].UEKPI$_{RBS}$ in the S1DPI REPORT and continue to the next ID$_{BEARER}$. Similarly, if UBList[ ] is empty, the IKCC handler 808 may insert PacketLossCount(UL/DL) and AvgPacketDelay(UL/DL) from DNSSLIST$_{RBS}$[Index$_{RBS}$][Index$_{CELL}$].UEList[Index$_{UE}$].UEKPI$_{RBS}$, in the S1DPI REPORT and continue to the next ID$_{UE}$. Further, if the UEList[ ] is empty, the IKCC handler 808 may determine that there is no monitoring required and do not send the S1DPI_REPORT.

At step 1003, the control logic may further include the steps of pre-configuring list of entities to be monitored at step 1013, updating list of entities to be monitored at runtime at step 1014, performing KPI consolidation and aggregation at step 1015, detecting application session performance at step 1016, and adapting performance thresholds at step 1017.

At step 1013, OAM may send OAM_UE_MONITOR_LIST_REQ consisting of ID$_{RBS}$ and list of UEID$_{Global}$ to be monitored. Upon reception of OAM_UE_MONITOR_LIST_REQ, the IRKC handler 710 in the DNSS 207 may update ListPreConfiguredUE[ID$_{RBS}$][ ] with the received list. Additionally, the OAM may send OAM_APP_MONITOR_LIST_REQ consisting of ID$_{RBS}$ and CellConfig$_{RBS}$(s) for the ID$_{RBS}$. Upon reception of OAM_APP_MONITOR_LIST_REQ, the IRKC handler 710 in the DNSS 207 may update ListPreConfigApps[ID$_{RBS}$][ ] with the received list.

At step 1014, the IKCC handler 808 may check if RKR has been received. Upon receipt, the IKCC handler 808 may parse the CELLRecord$_{RBS}$ to check the ActiveUE$_{List}$[ ] and DeactivatedUE$_{List}$[ ]. If any additional UE, Bearer or application is added, the ActiveUE$_{List}$[ ] may be updated and if any UE, Bearer or application is deleted, the DeactivatedUE$_{List}$[ ] may be updated. If ActiveUE$_{List}$[ ] is present in RKR, the IKCC handler 808 may fetch the UEID$_{Global}$ for each ID$_{UE}$ and check if the UEID$_{Global}$ is already present in the LIST$_{RBS}$[Index$_{RBS}$][Index$_{CELL}$].LIST_UE$_{ARNSS}$[ ]. If the UEID$_{Global}$ is already present, the IKCC handler 808 may determine that there has been change in either the bearer list or the applications running in the UE. The IKCC handler 808 may then check if the UBList[ ] is empty. If not, then the IKCC handler 808 may check for every ID$_{Bearer}$ present in the UBList[ ] and compare with the LIST$_{RBS}$[Index$_{RBS}$][Index$_{CELL}$].LIST_UE$_{ARNSS}$[ID$_{UE}$].UBList[ ] so as to determine if all the ID$_{Bearer}$ is present in LIST$_{RBS}$[Index$_{RBS}$][Index$_{CELL}$]. LIST_UE$_{ARNSS}$[ID$_{UE}$].UBList[ ]. If not, the new bearer may be added for the UE by adding the new ID$_{Bearer}$ in LIST$_{RBS}$[Index$_{RBS}$][Index$_{CELL}$].LIST_UE$_{ARNSS}$ [ID$_{UE}$].UBList[ ]. The IKCC handler 808 may also parse the UASList[ ] for the ID$_{Bearer}$ so as to determine if the UASList[ ] is not empty. If the UASList[ ] is not empty, the IKCC handler 808 may update the LIST$_{RBS}$[Index$_{RBS}$][Index$_{CELL}$].LIST_UE$_{ARNSS}$[ID$_{UE}$].UBList[ ].UASList[ ] with the received UASList[ ]. However, if the UASList[ ] is empty, the IKCC handler 808 may determine that user application (UA) list not found and only Bearer level aggregation may be configured. Further, if Bearer details are not present in the RKR, the aggregation may be only configured at the UE level. Further, if the UBList[ ] is empty, the IKCC handler 808 may determine that it is an invalid entry and may not change LIST$_{RBS}$[Index$_{RBS}$][Index$_{CELL}$].LIST_UE$_{ARNSS}$[ ]. Moreover, if the UEID$_{Global}$ is not present in the LIST$_{RBS}$[Index$_{RBS}$][Index$_{CELL}$].LIST_UE$_{ARNSS}$[ ], the IKCC handler 808 may determine that it is a new UE attached to the RBS 201.

The IKCC handler 808 may further determine if the ListPreConfiguredUE[ID$_{RBS}$][ ] is empty. If true, the IKCC handler 808 may determine that OAM has not configured any specific list of UE's to be monitored and all UE's are to be monitored. The IKCC handler 808 may then add the $UEID_{Global}$ as a new entry in the $LIST_{RBS}[Index_{RBS}]$ $[Index_{CELL}].LIST\_UE_{ARNSS}[\ ]$. The IKCC handler 808 may also create the nested structure of bearer and applications for the UE if present in RKR. However, if ListPreConfiguredUE $[ID_{RBS}][\ ]$ is not empty, the IKCC handler 808 may determine that OAM has preconfigured a list of UE's to be monitored, and only those UE's are to be monitored. The IKCC handler 808 may further parse the ListPreConfiguredUE$[ID_{RBS}][\ ]$ and check if the $UEID_{Global}$ is present in the list. If present, the IKCC handler 808 may add the $UEID_{Global}$ in the $LIST_{RBS}[Index_{RBS}][Index_{CELL}].LIST\_UE_{ARNSS}[\ ]$ and update the $LIST_{RBS}[Index_{RBS}]$ $[Index_{CELL}].LIST\_UE_{ARNSS}[ID_{UE}].UBList[\ ]$ with the bearer list received in RKR. Further, for each $ID_{Bearer}$ in the $LIST_{RBS}[Index_{RBS}][Index_{CELL}].LIST\_UE_{ARNSS}[ID_{UE}].$ $UBList[\ ]$, the IKCC handler 808 may check if an $UE_{app}$ list is present in the RKR. If present and If ListPreConfigApps $[ID_{RBS}][\ ]$ is not empty, the IKCC handler 808 may update the $LIST_{RBS}[Index_{RBS}][Index_{CELL}].LIST\_UE_{ARNSS}$ $[ID_{UE}].UBList[ID_{Bearer}].UASList[\ ]$ with the list present in ListPreConfigApps$[ID_{RBS}][\ ]$. However, if $UE_{app}$ list is not present, the IKCC handler 808 may update the $LIST_{RBS}$ $[Index_{RBS}][Index_{CELL}].LIST\_UE_{ARNSS}[ID_{UE}].$ $UBList[ID_{Bearer}].UASList[\ ]$ with the list present in RKR. Further, if $UEID_{Global}$ is not present, the IKCC handler 808 may not add the $UEID_{Global}$ in the $LIST_{RBS}[Index_{RBS}][Index_{CELL}].LIST\_UE_{ARNSS}[\ ]$.

Further, if DeactivatedUE$_{List}[\ ]$ is present in the RKR, the IKCC handler 808 may find the $UEID_{Global}$ for each $ID_{UE}$ and check if the $UEID_{Global}$ is already present in the $LIST_{RBS}[Index_{RBS}][Index_{CELL}].LIST\_UE_{ARNSS}[\ ]$. If present, the IKCC handler 808 may check if the $LIST_{RBS}[Index_{RBS}]$ $[Index_{CELL}].LIST\_UE_{ARNSS}[ID_{UE}].UBList[\ ]$ includes any entries. If true, the IKCC handler 808 may check, for each $ID_{Bearer}$, if there are any app entries in $LIST_{RBS}[Index_{RBS}]$ $[Index_{CELL}].LIST\_UE_{ARNSS}[ID_{UE}].UBList[ID_{Bearer}].$ $UASList[ID_{App}]$ and remove that application entry. However, if there are no entries, IKCC handler 808 may determine that whole bearer is to be removed, and may delete the entry for every $ID_{Bearer}$ present in $LIST_{RBS}[Index_{RBS}][Index_{CELL}].LIST\_UE_{ARNSS}[ID_{UE}].UBList[ID_{Bearer}]$. Further, if the $UEID_{Global}$ is not present, the IKCC handler 808 may delete the entry denoted by $ID_{UE}$, $LIST_{RBS}[Index_{RBS}][Index_{CELL}].LIST\_UE_{ARNSS}[ID_{UE}]$.

Further, if RKR includes both $CellKPI_{present}$ and $UEKPI_{present}$ and both are set as 1, or if only $UEKPI_{present}$ is set as 1, then the IKCC handler 808 may determine that there is no change in the Active UE/Bearer or application and may read the UEKPI. For every UE present in the UEList[ ], the IKCC handler may check if UBList[ ] is present. If present, the IKCC handler 80-8 may determine that Bearer level data is present for each bearer in the UEList$[Index_{UE}].UBList[\ ]$. Further, the IKCC handler may check if the UEList$[Index_E].UBList[Index_{Bearer}]$ include UASList[ ]. If so, the IKCC handler 808 may perform aggregation at the user application level. For every entry in UASList[ ], the IKCC handler 808 may update $LIST_{RBS}[Index_{RBS}]$ $[Index_{CELL}].LIST\_UE_{ARNSS}[Index_{UE}].UBList[Index_{Bearer}].$ UASList$[Index_{Application}].UEKPI_{RBS}$ with the received $UEKPI_{RBS}$. However, if the same does not include UASList[ ], the IKCC handler 808 may perform aggregation at the bearer level. The IKCC handler 808 may update $LIST_{RBS}[Index_{RBS}][Index_{CELL}].LIST\_UE_{ARNSS}[Index_{UE}].$ $UBList\ [Index_{Bearer}].UEKPI_{RBS}$ with the $UEKPI_{RB}$ received in RKR. Further, if UBList[ ] is not present, the IKCC handler 808 perform aggregation at the UE level. The IKCC handler 808 may then populate $LIST_{RBS}[Index_{RBS}]$ $[Index_{CELL}].LIST\_UE_{ARNSS}[Index_{UE}].\ UEKPI_{RBS}$ with the $UEKPI_{RBS}$ received in the RKR.

At step 1015, the IKCC handler 808 may receive both the RKR from IRKC handler 710 and/or S DPI REPORT from IS1DPI handler 709. If the received RKR includes UE specific records, the IKCC handler 808 may check for each $ID_{UE}$ in the RKR. The IKCC handler 808 may then populate the $UEID_{Global}$, $UEID_{GlobalType}$, $UEID_{Local}$, $UEMacCrc_{DL}$, in $LIST_{RBS}[Index_{RBS}][Index_{CELL}].LIST\_UE_{ARNSS}[\ ]$. The IKCC handler 808 may then check if the RKR includes UBList[ ]. If true, then, for each $ID_{Bearer}$ in the UBList[ ], the IKCC handler 808 may populate $LIST_{RBS}[Index_{RBS}]$ $[Index_{CELL}].\ LIST\ UE_{ARNSS}[Index_{UE}].UBList[ID_{Bearer}]$ with $ID_{Bearer}$, $QCI_{Bearer}$, $TEID_{UL}$ and $TEID_{DL}$. The IKCC handler 808 may further check if UASList[ ] is present for the $ID_{Bearer}$. If true, then, for each $ID_{UEAPP}$, the IKCC handler 808 may populate $ID_{Application}$, $Name_{Application}$ and $UEKPI_{RBS}$ as received in RKR in the structure $LIST_{RBS}$ $[Index_{RBS}][Index_{CELL}].\ LIST\_UE_{ARNSS}[Index_{UE}].UBList$ $[Index_{Bearer}].UASList[Index_{UA}]$. However, if UASList[ ] is not present, the IKCC handler 808 may populate $LIST_{RBS}$ $[Index_{RBS}][Index_{CELL}].\ LIST\_UE_{ARNSS}[Index_{UE}].UBList$ $[Index_{Bearer}].\ UEKPI_{RB}$ with the $UEKPI_{RBS}$ received for the $ID_{Bearer}$. Further, if the RKR does not include UBList[ ], then the IKCC handler 808 may determine that UE specific KPI's are present in the $UEKPI_{RBS}$ structure. The IKCC handler 808 may populate $LIST_{RBS}[Index_{RBS}][Index_{CELL}].LIST\_UE_{ARNSS}[Index_{UE}].UEKPI_{RBS}$ with $UEKPI_{RBS}$ received in RKR.

However, if the RKR is carrying a cell specific report, the IKCC handler 808 may determine the complete list of UE's attached with the RBS from the $LIST\_UE_{ARNSS}[\ ]$. It should be noted that If ListPreConfigApps$[ID_{RBS}][\ ]$ is not populated by OAM and is populated upon reception of RKR, it may not contain the $Threshold_{ue-app}$. In such case, IKCC handler 808 may send the RBS_APP_THRESHOLD_REQ consisting of $ID_{RBS}$ followed by the list of application ID's to OAM using the DNSS-OAM interface. The OAM may respond with RBS_APP_THRESHOLD_RES containing $ID_{RBS}$ followed by the list of $ID_{UEAPP}$ and $THRESHOLD_{UEAPP}$. Upon reception of RBS_APP_THRESHOLD_RES in IKCC handler 808, the received values may be stored. The RBS_KPI_CONFIGURATION_REQ may be generated with $RBS_{id}$, $T_{KPI\_GENERATION\_INTERVAL}$, $T_{KPI\_COLLECTION\_INTERVAL}$, updated list of KPI's to be monitored, and Attached_Monitor_List$_{ue}$[ ] including the UE, Bearer and application details.

Further, upon reception of S1DPI REPORT, the IKCC handler 808 may update $UERecord_{ARNSS}[\ ]$. If S1DPI_REPORT includes the LIST_UE[ ], then, for each $Index_{UE}$ in LIST_UE[ ], the IKCC handler 808 may check if it includes UBLIST[ ]. If true, then, for each $Index_{Bearer}$ in UBLIST[ ], the IKCC handler 808 may determine if it includes UASLIST[ ]. If true, then, for each $Index_{App}$ in UASLIST[ ], the IKCC handler 808 may update $LIST_{RBS}$ $[Index_{RBS}][Index_{CELL}].LIST\_UE_{ARNSS}[Index_{UE}].UBList$ $[Index_{Bearer}].\ UASLIST[Index_{App}]$ with PacketLossCountUL, PacketLossCountDL, AvgPacketDelayUL and AvgPacketDelayDL. However, if it does not include UASLIST[ ], then, for $Index_{Bearer}$ in UBLIST[ ], the IKCC handler 808 may update $LIST_{RBS}[Index_{RBS}][Index_{CELL}].$ $LIST\_UE_{ARNSS}\ [Index_{UE}].UBList[Index_{Bearer}]$ with PacketLossCountUL, PacketLossCountDL, AvgPacketDelayUL and AvgPacketDelayDL. Further, if it does not include UBLIST[ ], then the IKCC handler 808 may update $LIST_{RBS}$ $[Index_{RBS}][Index_{CELL}].\ LIST\_UE_{ARNSS}\ [Index_{UE}]$ with PacketLossCountUL, PacketLossCountDL, AvgPacketDelayUL and AvgPacketDelayDL.

At step 1016, the performance of the user application session (UASP) may be quantified as per following logic. All the gathered KPI's from RBS may be first normalized and then multiplied with a corresponding co-efficient. The sum of such multiplied KPI may then determine the performance. The parameters for calculating the performance indicator (performanceIndicator$_{Calc}$) may include, but may not be limited to, PdcpBitRate$_{DL}$, PdcpBitRate$_{UL}$, PdcpDropRate$_{DL}$, PdcpLossRate$_{UL}$, PpdcpDelay$_{UL}$, RlcDelay$_{DL}$, MacLossRate$_{DL}$, PacketLossCountUL, PacketLossCountDL, MacHarqReTrans$_{DL}$, MacSchd$_{DL}$, MacCqi$_{DL}$, RlcReTrans$_{DL}$, AvgPacketDelayUL, and AvgPacketDelayDL. It should be noted that, in some embodiments, some of the parameters may be mandatory parameters and may include PdcpBitRate$_{DL}$, PdcpBitRate$_{UL}$, PdcpDropRate$_{DL}$, PdcpLossRate$_{UL}$, PpdcpDelay$_{UL}$, RlcDelay$_{DL}$, MacLossRate$_{DL}$, PacketLossCountUL, PacketLossCountDL In some embodiments, performanceIndicator$_{Calc}$ may be calculated as per equation (6) below:

$$\begin{aligned}
\text{performanceIndicator}_{Calc} = &\text{Co-efficient}_{PDCPBitRateDL} * \text{PdcpBitRate}_{DL} + \\
&\text{Co-efficient}_{PDCPBitRateUL} * \text{PdcpBitRate}_{UL} + \\
&\text{CoefficientP}_{DCPDropRateDL} * \text{PdcpDropRate}_{DL} + \\
&\text{Co-efficient}_{PdcpLossRateUL} * \text{PdcpLossRate}_{UL} + \\
&\text{Co-efficient}_{PdcpDelayed} UL * \text{PdcpDelay}_{UL} + \\
&\text{Co-efficient}_{RlcDelayDL} * \text{RlcDelay}_{DL} + \\
&\text{Co-efficient}_{MacLossRateDL} * \text{MacLossRate}_{DL} + \\
&\text{Co-efficient}_{PacketLossCountUL} * \text{PacketLossCountUL} + \\
&\text{Co-efficient}_{PacketLossCountDL} * \text{PacketLossCountDL} + \\
&\text{Co-efficient}_{MacHarqReTransDL} * \text{MacHarqReTrans}_{DL} + \\
&\text{Co-efficient}_{MacSchdDL} * \text{MacSchd}_{DL} + \\
&\text{Co-efficient}_{MacCqiDL} * \text{MacCqi}_{DL} + \\
&\text{Co-efficient}_{RlcReTransDL} * \text{RlcReTrans}_{DL} + \\
&\text{Co-efficient}_{AvgPacketDelayUL} * \text{AvgPacketDelayUL} + \\
&\text{Co-efficient}_{AvgPacketDelayDL} * \text{AvgPacketDelayDL}
\end{aligned}$$

Equation (6)

whereas the Co-efficient$_{PDCPBitRateDL}$, Co-efficient$_{PDCPBitRateUL}$, Co-efficient$_{PDCPDropRateDL}$, Co-efficient$_{PdcpLossRateUL}$, Co-efficient$_{PdcpDelayedUL}$, Co-efficient$_{RlcDelayDL}$, Co-efficient$_{RlcReTransDL}$, Co-efficient$_{MacLossRateDL}$, Co-efficient$_{MacHarqReTransDL}$, CO-efficient$_{MacSchdDL}$, Co-efficient$_{MacCqiDL}$, Co-efficient$_{PacketLossCountUL}$, CO-efficient$_{PacketLossCountDL}$, Co-efficient$_{AvgPacketDelayUL}$, Co-efficient$_{AvgPacketDelayDL}$, CO-efficient$_{PacketLossCountUL}$ and Co-efficient$_{PacketLossCountDL}$ are the co-efficient's assigned for corresponding parameters for calculation of the performance indicator.

It should be noted that the co-efficient$_x$ may be calculated based on the ratio of the individual co-efficient's for calculation as per equation (7) below:

Co-efficient$_x$=Ratio$_x$/(Sum of Ratio$_1$ to Ratio$_n$)   Equation (7)

For example, if we are using only the mandatory parameters for calculation, the ratio of co-efficient of parameters may include Ratio$_{PDCPBitRateD}$, Ratio$_{PDCPBitRateUL}$, Ratio$_{PDCPDropRateDL}$, Ratio$_{PdcpLossRateUL}$, Ratio$_{PdcpDelayedUL}$, Ratio$_{RlcDelayDL}$, Ratio$_{MacLossRateDL}$, Ratio$_{PacketLossCountUL}$, Ratio$_{PacketLossCountDL}$. These ratio may be preconfigured for the RBS and may be configurable by OAM. In this case, the co-efficient$_{PDCPBitRateDL}$ may be calculated as per equation (7) as follows:

Co-efficient$_{PDCPBitRateDL}$=(Ratio$_{PDCPBitRateDL}$)/
(Ratio$_{PCPBitRateDL}$+Ratio$_{PDCPBitRateUL}$+
Ratio$_{PDCPDropRateDL}$+Ratio$_{PdcpLossRateUL}$+
Ratio$_{PdcpDelayedUL}$+Ratio$_{RlcDelayDL}$+
Ratio$_{MacLossRateDL}$+Ratio$_{PacketLossCountUL}$+
Ratio$_{PacketLossCountDL}$)

For each ID$_{UE}$ in LIST$_{RBS}$[Index$_{RBS}$][Index$_{CELL}$].LIST_UE$_{ARNSS}$[ ], the IASPD handler 809 may check if it includes UBLIST[ ]. If true, then, for each ID$_{Bearer}$, the IASPD handler may check if there is a UASLIST[ ]. If true, then, for each ID$_{UEAPP}$ in UASLIST[ ], the IASPD handler 809 may compute the performanceIndicator$_{Calc}$ and save the same in the LIST$_{RBS}$[Index$_{RBS}$][Index$_{CELL}$].LIST_UE$_{ARNSS}$ [Index$_{UE}$].UBList[Index$_{Bearer}$]. UASList[Index$_{UEAPP}$].performanceIndicator$_{Calc}$. However, if the UASLIST[ ] is not present, then, for each ID$_{Bearer}$, the IASPD handler 809 may compute the performanceIndicator$_{Calc}$ and save the same in the LIST$_{RBS}$[Index$_{RBS}$][Index$_{CELL}$].LIST_UE$_{ARNSS}$[Index$_{UE}$]. UBList[Index$_{Bearer}$].performanceIndicator$_{Calc}$. Further, if the UBLIST[ ] is not present, then, the IASPD 809 may determine that Bearer information is not present and hence the UEKPI$_{RBS}$ may be aggregated as per the ID$_{UE}$. The IASPD 809 may compute, for each ID$_{UE}$, the performanceIndicator$_{Calc}$ and save the same in LIST$_{RBS}$[Index$_{RBS}$] [Index$_{CELL}$].LIST_UE$_{ARNSS}$ [Index$_{UE}$].performance Indicator$_{Calc}$.

Further, if ID$_{ue}$ is in Attached_Monitor_List$_{ue}$ and ID$_{application}$ is in Running_Monitor_List$_{app}$, then the IASPD handler 809 may combine ID$_{Ue}$, TEID$_{ul}$, TEID$_{dl}$, ID$_{Bearer}$ and ID$_{application}$ to generate a list of ID$_{application}$'S running in the RBS. The IASPD handler 809 may further determine the ID$_{application}$'S combined (KPI's) and update Running_Monitor_List$_{app}$. However, if ID$_{Ue}$ is in Attached_Monitor_List$_{ue}$ and ID$_{application}$ is not present in the Running_Monitor_List$_{app}$, then, the IASPD handler 809 may add ID$_{application}$ to the Running_Monitor_List$_{app}$ and then add performanceIndicator$_{Calc}$ for the ID$_{application}$ to the LIST$_{RBS}$. The IASPD handler 809 may then compare the performanceIndicator$_{Calc}$ for the ID$_{UE}$ or ID$_{Bearer}$ or ID$_{UEAPP}$ with the ThresholdPerformanceIndicator set by the OAM. If performanceIndicator$_{Calc}$ is same or more than ThresholdPerformanceIndicator, the IASPD handler 809 may determine that the Performance is as expected. However, if performanceIndicator$_{Calc}$ is below the threshold set by OAM, the IASPD handler 809 may determine if performanceIndicator$_{Calc}$ is less than 1/5th of ThresholdPerformanceIndicator. In such case, based on the co-efficient's assigned for performanceIndicator$_{Calc}$, a lesser number of parameters may be be monitored. The RBS_RBS_RECONFIG_REQ message may be sent to the DNSS 207, which may reconfigure RBS 201 with new set of parameters to be monitored. Alternatively, if performanceIndicator$_{Calc}$ for UE/Bearer/Application is much smaller/greater than the Threshold, then the IASPD handler 809 may modify the T$_{KPI\_GENERATION\_INTERVAL}$ and send a DNSS_RECONFIGURATION_REQ to reset the T$_{KPI\_GENERATION\_INTERVAL}$ at the DNSS 207.

At step 1017, the IASPD handler 809 may pre-configure or re-configure the co-efficient ratios. The co-efficient ratios for calculation of performanceIndicator$_{Calc}$ is pre-configured by OAM at the ARNSS 208. The OAM may send the OAM_ARNSS_CO-EFFICIENT_RATIO_CONFIG message to the IASPD handler 809. The OAM_ARNSS_CO-EFFICIENT_RATIO_CONFIG may include message type followed by the co-efficient ratios for the monitored parameters. Upon reception of OAM_ARNSS_CO-EFFICIENT_RATIO_CONFIG, the IASPD handler 809 may update the co-efficient's for calculation of performanceIndicator$_{Calc}$. Further, the co-efficient ratios and/or thresholds for calculation of performanceIndicator$_{Calc}$ and for comparing performanceIndicator$_{Calc}$ may be re-configured or adapted.

At step 1004, the control logic may further include the steps of determining aggregated application performance at step 1018, determining and recommending possible network actions at step 1019, and analyzing and determining the accuracy of network action performed in previous cycle and suggesting possible adaptations to thresholds at step 1020.

At step 1018, the IASPD handler 809 may determine application session specific performance indicator. For an Index$_{RBS}$, the IASPD handler 809 may calculate the average performanceIndicator$_{Calc}$ for a user application and update the AGGLIST$_{RBS}$. Additionally, for every ID$_{APP}$ present in Monitor_List$_{App}$[ ], the IASPD handler 809 may rank the RBS based on the performanceIndicator$_{Calc}$. The RBS with the highest average performanceIndicator$_{Calc}$ for the UE application may get the lowest rank. The calculated values are saved in RankedRBS[ID$_{App}$].LISTRBS[ ]. If Performance_Indicator$_{ue-app}$ is below the Threshold$_{ue-app}$, for any UE or Bearer or Application, a corrective action may be triggered for the ID$_{UE}$. For an ID$_{UE\,for}$ which performanceIndicator$_{Calc}$ is below the threshold value, the IASPD handler 809 may send GET_UENBRLIST to IRRM handler 509 using MSS-ARNSS interface. The IRRM handler 509 may uses standard method to calculate the neighbor list of the UE with the highest signal strength and may respond via RBS_ANALYTICS_MEASURED_NBR. In some embodiments, the RBS_ANALYTICS_MEASURED_NBR may include the ID$_{UE}$, ID$_{APP}$ followed by Masured$_{Nbr\text{-}list}$ of suitable RBS. IRRM handler 509 may compare the list of suitable RBS received in UENBRLIST_INFO to the RankedRBS[ID$_{App}$].LISTRBS[ ]. The suitable RBS's may be ordered as per the ranks present in RankedRBS[ID$_{App}$].LISTRBS[ ]. The ICAD handler 810 may then generate RBS_ANALYTICS_SUGGESTIVE_TRIGGER and may send the same to the IRRM handler 509 using MSS-ARNSS interface. The RBS_ANALYTICS_SUGGESTIVE_TRIGGER may include the ID$_{Ue}$ and list of ID$_{RBS's}$. The IRRM handler 509 may utilize standard methods to determine the possible candidate RBS's (Masured$_{Nbr\text{-}list}$) to which ID$_{Ue}$ may be handed over. By comparing the average Performance_Indicator$_{ue\text{-}app}$, backhaul throughput and average cell PRB usage, the IRRM handler 509 may determine the MasuredSuitable$_{Nbr\text{-}list}$ which is a subset of Masured$_{Nbr\text{-}list}$. For each RBS in the MasuredSuitable$_{Nbr\text{-}list}$ received in the RBS_ANALYTICS_MEASURED_NBR, ICAd handler 810 may trigger RBS_ANALYTICS_HANDOVER_SUGGESTION towards IRRM 509.

At step 1019, after the HO suggestion is forwarded to IRRM handler 509, the ICAD handler 810 may start a TIMER$_{HO\_COMPLETE\_TIMER}$ with the value T$_{HO\_COMPLETE\_TIMER}$. It should be noted that the timer may be indexed as per the UE and application. The ICAD handler 810 may then populate LIST$_{RBS}$[Index$_{RBS}$][Index$_{CELL}$].LIST_UE$_{ARNSS}$[Index$_{UE}$].UBList[Index$_{Bearer}$]. PreHoPreformance$_{Indicator}$ with performanceIndicator$_{Calc}$ and may set LIST$_{RBS}$[Index$_{RBS}$][Index$_{CELL}$].LIST_UE$_{ARNSS}$[Index$_{UE}$].UBList[Index$_{Bearer}$].HoSuggested$_{Flag}$ to 1. Upon reception of the KPI's for the same ID$_{UE}$, the ICAD handler 810 may check if the ID$_{RBS}$ is among one of the ID$_{RBS}$ sent as a suggestion via RBS_ANALYTICS_HANDOVER_SUGGESTION.

At step 1020, if an UE is handed over to a NBS, the ICAD handler 810 may verify if performanceIndicator$_{Calc}$ is better than the threshold set. If the performanceIndicator$_{Calc}$ is not better than the threshold, compare the PreHoPreformance$_{Indicator}$ for the same UE before the HO was suggested. As will be appreciated, a better performanceIndicator$_{Calc}$ compared to PreHoPreformance$_{Indicator}$ may suggest partial increase in performance but not the threshold is not met and hence tuning of the co-efficients for calculation of performanceIndicator$_{Calc}$ may be required. In contrast, a worse performanceIndicator$_{Calc}$ compared to PreHoPreformance$_{Indicator}$ may suggest degradation of service beyond PreHoPreformance$_{Indicator}$ level. In either of the above cases, the ICAD handler 810 may tune the thresholds for HO or Co-efficient$_{PDCPBitRateDL}$, Co-efficient$_{PDCPBitRateUL}$, Co-efficient$_{PDCPDropRateDL}$, Co-efficient$_{PdcpLossRateUL}$, Weight$_{PdcpDelayedUL}$, Co-efficient$_{RlcDelayDL}$, Co-efficient$_{RlcReTransDL}$, Co-efficient$_{MacLossRateDL}$, Co-efficient$_{MacHarqReTransDL}$, Co-efficient$_{MacSchdDL}$, Co-efficient$_{MacCqiDL}$, Co-efficient$_{PacketLossCountUL}$, Co-efficient$_{PacketLossCountDL}$, CO-efficient$_{AvgPacketDelayUL}$ and Co-efficient$_{AvgPacketDelayDL}$ or both so as to calculate a PerformanceIndicator$_{Calc}$ better suited for the HO using a standard mechanism. It should be noted that if the performanceIndicator$_{Calc}$ is not better than the threshold, the goal for improved performance may not be achieved.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 11:
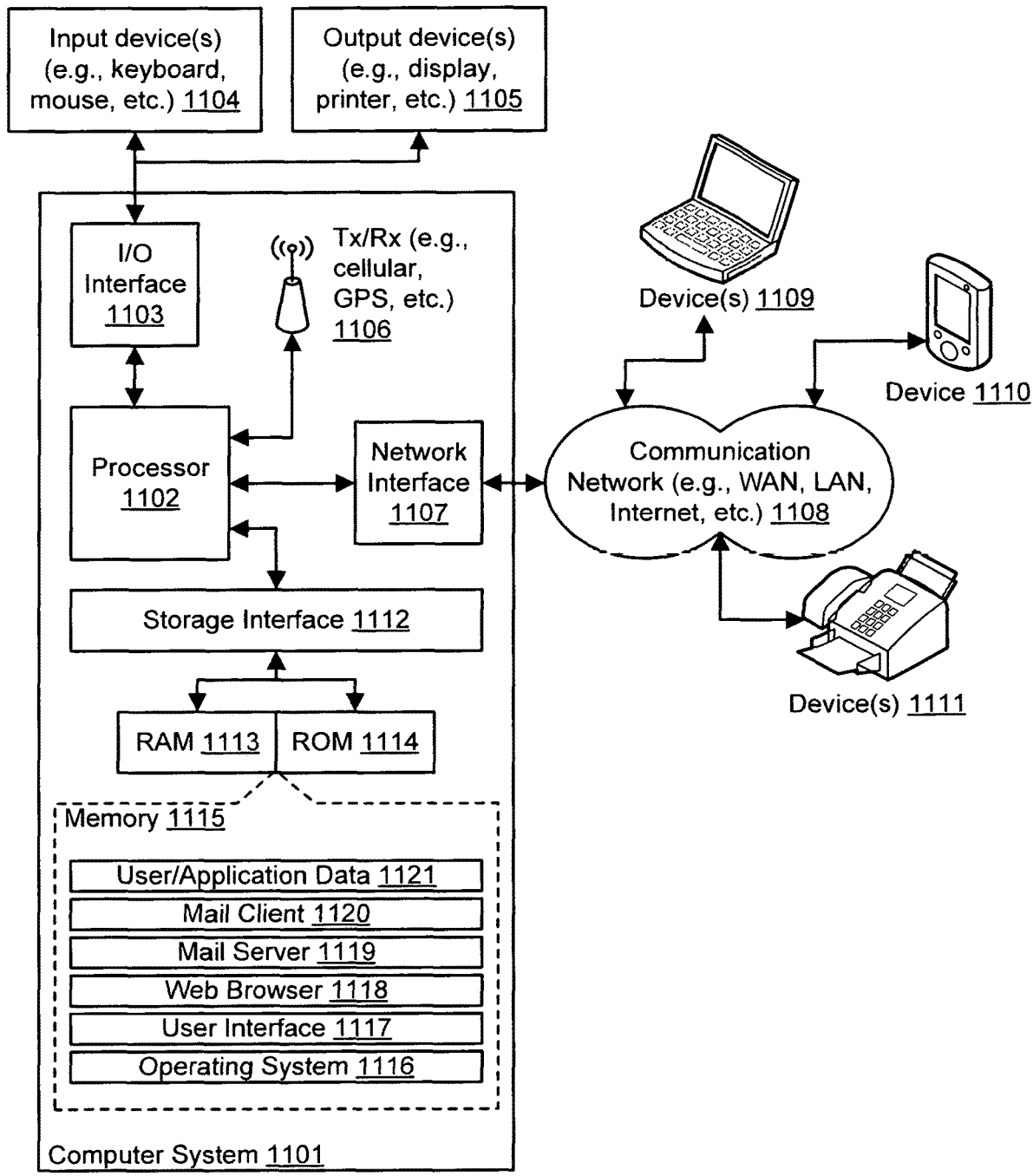
FIG. 11 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 11, a block diagram of an exemplary computer system 1101 for implementing embodiments consistent with the present disclosure is illustrated. Variations of computer system 1101 may be used for implementing components of communication network 100, the system 200, and various components of system 300, 400, 500, 600, 700, and 800 for processing data packets for transmission in the communication network. Computer system 1101 may include a central processing unit ("CPU" or "processor") 1102. Processor 1102 may include at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 1102 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1102 may be disposed in communication with one or more input/output (I/O) devices via I/O interface

1103. The I/O interface 1103 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 1103, the computer system 1101 may communicate with one or more I/O devices. For example, the input device 1104 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 1105 may be a printer, fax machine, video display (e.g., cathode ray tube (CRT), liquid crystal display (LCD), light-emitting diode (LED), plasma, or the like), audio speaker, etc. In some embodiments, a transceiver 1106 may be disposed in connection with the processor 1102. The transceiver may facilitate various types of wireless transmission or reception. For example, the transceiver may include an antenna operatively connected to a transceiver chip (e.g., Texas Instruments WiLink WL1283, Broadcom BCM47501UB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 1102 may be disposed in communication with a communication network 1108 via a network interface 1107. The network interface 1107 may communicate with the communication network 1108. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1108 may include, without limitation, a direct interconnection, local area network (LAN), wide area network (WAN), wireless network (e.g., using Wireless Application Protocol), the Internet, etc. Using the network interface 1107 and the communication network 1108, the computer system 1101 may communicate with devices 1109, 1110, and 1111. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 1101 may itself embody one or more of these devices.

In some embodiments, the processor 1102 may be disposed in communication with one or more memory devices (e.g., RAM 1113, ROM 1114, etc.) via a storage interface 1112. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 1116, user interface application 1117, web browser 1118, mail server 1119, mail client 1120, user/application data 1121 (e.g., any data variables or data records discussed in this disclosure), etc. The operating system 1116 may facilitate resource management and operation of the computer system 1101. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 1117 may facilitate display, execution, interaction, manipulation, or operation of program components through textual or graphical facilities. For example, user interfaces may provide computer interaction interface elements on a display system operatively connected to the computer system 1101, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 1101 may implement a web browser 1118 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 1101 may implement a mail server 1119 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 1101 may implement a mail client 1120 stored program component. The mail client may be a mail viewing application, such as Apple Mail, Microsoft Entourage, Microsoft Outlook, Mozilla Thunderbird, etc.

In some embodiments, computer system 1101 may store user/application data 1121, such as the data, variables, records, etc. (e.g., user data, control data, configuration data, KPI's, performance indicator (e.g., UASP's), ratios, coefficients, thresholds, list of target RBS for handover, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The techniques described in various embodiments discussed above provide for effective maintenance of user's application specific network service session performances. Such maintenance may be performed by the network service provider so as to ensure customer satisfaction and experience. The network service session performance may be monitored with respect to a specific user equipment or device, a specific radios base station, or a specific application. Further, in some embodiments, the techniques provide for determining and recommending appropriate (e.g., corrective) network action based on such monitoring. For example, the appropriate network action may involve performing smart handover for improved service performance in the coverage area. In other words, the techniques provide for effective and efficient determination of appropriate network action (e.g., handover) by detecting application session specific service session performance degradation for one or more user equipment in order to improve or maintain application session performance and service quality in the coverage area. This is enabled by on-time and accurate information collection (UE, application, session), prediction of performance exception based on MoS threshold or configuration, and recommending appropriate corrective action (adjustment of specific (UE, application, session) collection frequency, or determination of appropriate neighboring base station for handover).

The specification has described system and method for maintaining user application session performances in a wireless communication network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A method of maintaining user application session performances in a wireless communication network, the method comprising:
    determining, by a network device in the wireless communication network, an aggregate user application session performance for each of a plurality of users and for each of a plurality of applications at a serving base station and at each of a plurality of neighboring base stations based on gathered performance data;
    determining, by the network device, an aggregate application performance level for each of the plurality of applications at the serving base station and at each of the plurality of neighboring base stations based on the aggregate user application session performances for the plurality of users at the serving base station and at each of the plurality of neighboring base stations respectively;
    determining, by the network device, an aggregate application performance based on the aggregate application performance levels for the plurality of applications at the serving base station and at the plurality of neighboring base stations; and
    maintaining, by the network device, the user application session performances by applying a determined corrective network action based on an average of aggregate applications performances at the serving base station and at each of the plurality of neighboring base stations, wherein the determined corrective network action comprises recommending a handover from the serving base station to one of the plurality of neighboring base stations based on a comparison among the average of aggregate applications performances for the serving base station and each of the plurality of neighboring base stations.

2. The method of claim 1, wherein determining the aggregate user application session performance at a given base station comprises:
    determining a user application session performance at a core network end of the given base station;
    determining a user application session performance at a radio interface end of the given base station; and
    determining the aggregate user application session performance at the given base station based on the user application session performance at the core network end and the user application session performance at the radio interface end.

3. The method of claim 2, wherein determining the user application session performance at the core network end comprises determining an association between received packets and a user application session from an uplink packet and a downlink packet using deep packet inspection.

4. The method of claim 2, wherein determining the user application session performance at the radio interface end comprises determining an association between user packets and a user application session using shallow packet inspection.

5. The method of claim 1, further comprising adapting gathering of performance data based on an analysis of trend for a pre-defined number of previous aggregate user application session performances.

6. The method of claim 1, further comprising determining an accuracy of a previous corrective network action based on the aggregate user application session performance.

7. The method of claim 6, further comprising updating or providing recommendations for updating, based on the accuracy, a co-efficient or a threshold value for determination of one or more process parameters.

8. A system for maintaining user application session performances in a wireless communication network, the system comprising:
a network device comprising at least one processor and a computer-readable medium storing instructions that, when executed by the at least one processor, cause the at least one processor to perform operations comprising:
determining an aggregate user application session performance for each of a plurality of users and for each of a plurality of applications at a serving base station and at each of a plurality of neighboring base stations based on gathered performance data;
determining an aggregate application performance level for each of the plurality of applications at the serving base station and at each of the plurality of neighboring base stations based on the aggregate user application session performances for the plurality of users at the serving base station and at each of the plurality of neighboring base stations respectively;
determining an aggregate application performance based on the aggregate application performance levels for the plurality of applications at the serving base station and at the plurality of neighboring base stations; and
maintaining the user application session performances by applying a determined corrective network action based on an average of aggregate applications performances at the serving base station and at each of the plurality of neighboring base stations, wherein the determined corrective network action comprises recommending a handover from the serving base station to one of the plurality of neighboring base stations based on a comparison among the average of aggregate applications performances for the serving base station and each of the plurality of neighboring base stations.

9. The wireless communication network system of claim 8, wherein determining the aggregate user application session performance at a given base station comprises:
determining a user application session performance at a core network end of the given base station;
determining a user application session performance at a radio interface end of the given base station; and
determining the aggregate user application session performance at the given base station based on the user application session performance at the core network end and the user application session performance at the radio interface end.

10. The wireless communication network system of claim 9, wherein determining the user application session performance at the core network end comprises determining an association between received packets and a user application session from an uplink packet and a downlink packet using deep packet inspection.

11. The wireless communication network system of claim 9, wherein determining the user application session performance at the radio interface end comprises determining an association between user packets and a user application session using shallow packet inspection.

12. The wireless communication network system of claim 8, wherein the operations further comprise adapting gathering of performance data based on an analysis of trend for a pre-defined number of previous aggregate user application session performances.

13. The wireless communication network system of claim 8, wherein the operations further comprise determining an accuracy of a previous corrective network action based on the aggregate user application session performance.

14. The wireless communication network system of claim 13, wherein the operations further comprise updating or providing recommendations for updating, based on the accuracy, a co-efficient or a threshold value for determination of one or more process parameters.

15. A non-transitory computer-readable medium storing computer-executable instructions for:
determining an aggregate user application session performance for each of a plurality of users and for each of a plurality of applications at a serving base station and at each of a plurality of neighboring base stations based on gathered performance data, wherein the serving base station and the plurality of neighboring base stations are a part of a wireless communication network;
determining an aggregate application performance level for each of the plurality of applications at the serving base station and at each of the plurality of neighboring base stations based on the aggregate user application session performances for the plurality of users at the serving base station and at each of the plurality of neighboring base stations respectively;
determining an aggregate application performance based on the aggregate application performance levels for the plurality of applications at the serving base station and at the plurality of neighboring base stations; and
maintaining the user application session performances by applying a determined corrective network action based on an average of aggregate applications performances at the serving base station and at each of the plurality of neighboring base stations, wherein the determined corrective network action comprises recommending a handover from the serving base station to one of the plurality of neighboring base stations based on a comparison among the average of aggregate applications performances for the serving base station and each of the plurality of neighboring base stations.

16. The non-transitory computer-readable medium of claim 15, wherein determining the aggregate user application session performance at a given base station comprises:
determining a user application session performance at a core network end of the given base station;
determining a user application session performance at a radio interface end of the given base station; and
determining the aggregate user application session performance at the given base station based on the user application session performance at the core network end and the user application session performance at the radio interface end.

17. The non-transitory computer-readable medium of claim 16, wherein determining the user application session performance at the core network end comprises determining an association between received packets and a user application session from an uplink packet and a downlink packet using deep packet inspection, and wherein determining the user application session performance at the radio interface end comprises determining an association between user packets and a user application session using shallow packet inspection.

\* \* \* \* \*